United States Patent
Louison et al.

(10) Patent No.: US 11,596,890 B2
(45) Date of Patent: Mar. 7, 2023

(54) RESTRICTION INDICATOR DEVICE FOR FILTER ASSEMBLY

(71) Applicant: Cummins Filtration IP, Inc., Columbus, IN (US)

(72) Inventors: Matt Louison, McFarland, WI (US); Ketan Vishwanath Shende, Madison, WI (US); Mark A. Herioux, Columbus, WI (US); Peter K. Herman, Stoughton, WI (US); Daniel Potratz, Stoughton, WI (US); Chirag D. Parikh, Madison, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 0 days.

(21) Appl. No.: 17/128,741

(22) Filed: Dec. 21, 2020

(65) Prior Publication Data

US 2021/0129065 A1    May 6, 2021

Related U.S. Application Data

(63) Continuation of application No. PCT/US2019/039513, filed on Jun. 27, 2019.
(Continued)

(51) Int. Cl.
*B01D 46/24* (2006.01)
*B01D 46/00* (2022.01)
(Continued)

(52) U.S. Cl.
CPC ....... *B01D 46/2414* (2013.01); *B01D 29/016* (2013.01); *B01D 29/114* (2013.01); *B01D 46/0086* (2013.01); *B01D 46/4254* (2013.01)

(58) Field of Classification Search
CPC ............ B01D 46/2414; B01D 46/0086; B01D 46/425; B01D 46/04; B01D 29/016;
(Continued)

(56) References Cited

U.S. PATENT DOCUMENTS 2,655,894 A * 10/1953 Rabbitt ................. F02M 35/09
116/DIG. 25
2,992,659 A    7/1961 Thomas
(Continued)

FOREIGN PATENT DOCUMENTS

CA         2459028         8/2004
CN         1192799 A       9/1998
(Continued)

OTHER PUBLICATIONS

International Search Report and Written Opinion from PCT Application No. PCT/US2018/012217, dated Mar. 20, 2018, pp. 1-7.
(Continued)

*Primary Examiner* — Robert A Hopkins
*Assistant Examiner* — Qianping He
(74) *Attorney, Agent, or Firm* — Foley & Lardner LLP

(57) ABSTRACT

A filter element comprises a filter media and a restriction indicator device. The restriction indicator device comprises an attachment portion and a movable portion. The attachment portion is attachable to a portion of the filter assembly. The movable portion is movable relative to the attachment portion between a non-buckled position and a buckled position. The movable portion moves from the non-buckled position to the buckled position once a predetermined pressure drop between an upstream side and a downstream side of the movable portion of the restriction indicator device is met.

13 Claims, 19 Drawing Sheets

Related U.S. Application Data

(60) Provisional application No. 62/693,084, filed on Jul. 2, 2018.

(51) Int. Cl.
  *B01D 29/11* (2006.01)
  *B01D 29/01* (2006.01)
  *B01D 46/42* (2006.01)

(58) Field of Classification Search
  CPC ...... B01D 29/114; B01D 46/24; B01D 46/00; B01D 29/11; B01D 29/01; B01D 46/42
  USPC ...................................... 55/498; 96/417, 421
  See application file for complete search history.

(56) References Cited

U.S. PATENT DOCUMENTS

| | | | |
|---|---|---|---|
| 3,279,155 | A | 10/1966 | Lambert |
| 3,743,801 | A | 7/1973 | Brobeck et al. |
| 3,939,457 | A | 2/1976 | Nelson |
| 4,020,783 | A | 5/1977 | Anderson et al. |
| 4,036,758 | A | 7/1977 | Combest |
| 4,189,724 | A | 2/1980 | Onuma et al. |
| 4,243,397 | A | 1/1981 | Tokar et al. |
| 4,436,218 | A | 3/1984 | Beese |
| 4,713,097 | A | 12/1987 | Grawi et al. |
| 4,880,411 | A | 11/1989 | Fangrow et al. |
| 5,110,560 | A | 5/1992 | Presz et al. |
| 5,164,558 | A | 11/1992 | Huff et al. |
| 5,222,525 | A | 6/1993 | Munroe |
| 5,549,722 | A | 8/1996 | Zemaitis et al. |
| 5,850,183 | A | 12/1998 | Berry, III |
| 6,327,902 | B1 | 12/2001 | Berry et al. |
| 6,989,104 | B2 | 1/2006 | Reamsnyder et al. |
| 7,182,855 | B1 | 2/2007 | O'Leary |
| 7,470,360 | B2 | 12/2008 | Berry, III et al. |
| 7,678,271 | B2 | 3/2010 | Curtin |
| 7,862,651 | B2 | 1/2011 | Stein et al. |
| 8,704,115 | B2 | 4/2014 | Blakely |
| 8,986,539 | B2 | 3/2015 | Herman et al. |
| 2004/0025582 | A1 | 2/2004 | Wiseman et al. |
| 2005/0193695 | A1 | 9/2005 | Holmes et al. |
| 2007/0256565 | A1 | 11/2007 | Sohn |
| 2008/0022856 | A1 | 1/2008 | Clements |
| 2009/0183565 | A1 | 7/2009 | Shamoon et al. |
| 2010/0000186 | A1 | 1/2010 | Newell |
| 2011/0011042 | A1 | 1/2011 | Gillingham et al. |
| 2012/0074888 | A1 | 3/2012 | Maekawa |
| 2013/0153685 | A1 | 6/2013 | Michael J. et al. |
| 2014/0298612 | A1* | 10/2014 | Williams ........... B01D 46/2414 55/498 |
| 2016/0153595 | A1 | 6/2016 | Arvelo et al. |
| 2019/0039873 | A1 | 2/2019 | Aslam et al. |

FOREIGN PATENT DOCUMENTS

| | | | |
|---|---|---|---|
| CN | 2630822 | Y | 8/2004 |
| CN | 102112172 | A | 6/2011 |
| CN | 102264263 | A | 11/2011 |
| CN | 102361675 | A | 2/2012 |
| CN | 102380270 | A | 3/2012 |
| CN | 203555564 | U * | 4/2014 |
| CN | 203555564 | U | 4/2014 |
| WO | WO-01/34414 | | 5/2001 |
| WO | WO-2015/049647 | A1 | 4/2015 |

OTHER PUBLICATIONS

International Search Report and Written Opinion issue for PCT Application No. PCT/US2019/039513 dated Sep. 17, 2019, 8 pages.

Non-Final Office Action on U.S. Appl. No. 16/473,791 dated Jul. 2, 2021.

Chinese Office Action issued for Chinese Patent Publicaiton No. CN 201980041232.2 dated Oct. 15, 2021, 17 pages.

Third Office Action issued for Chinese Patent Application No. 201980041232.2 dated Nov. 29, 2022, 78 pages, including English translation.

* cited by examiner

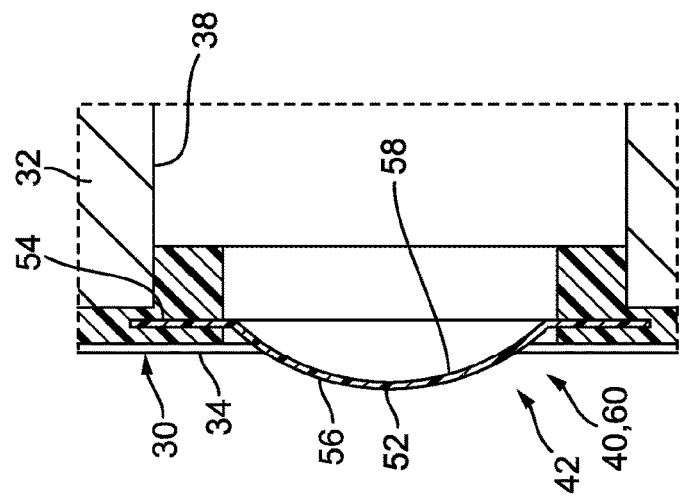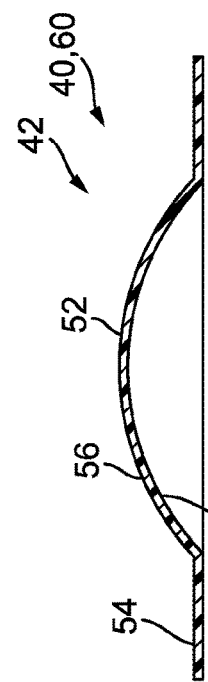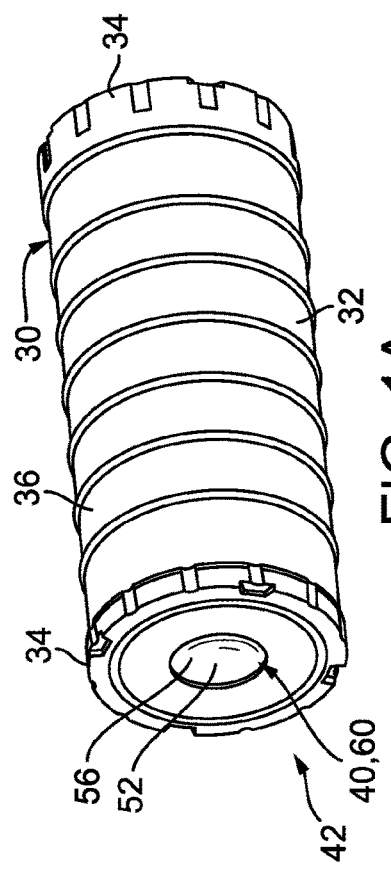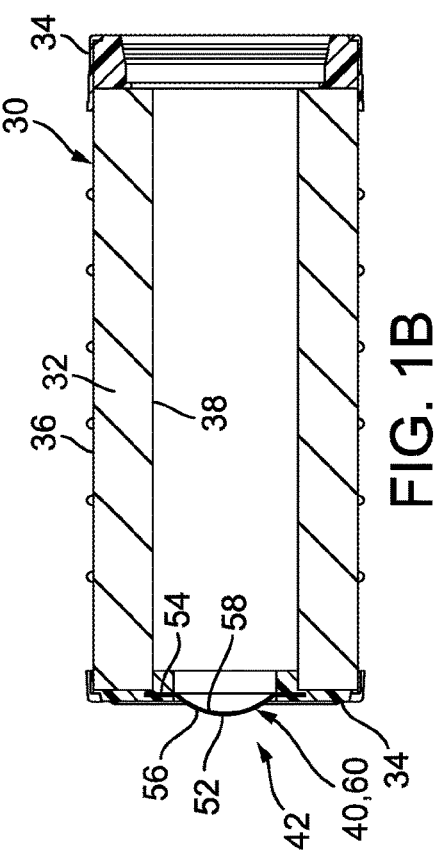

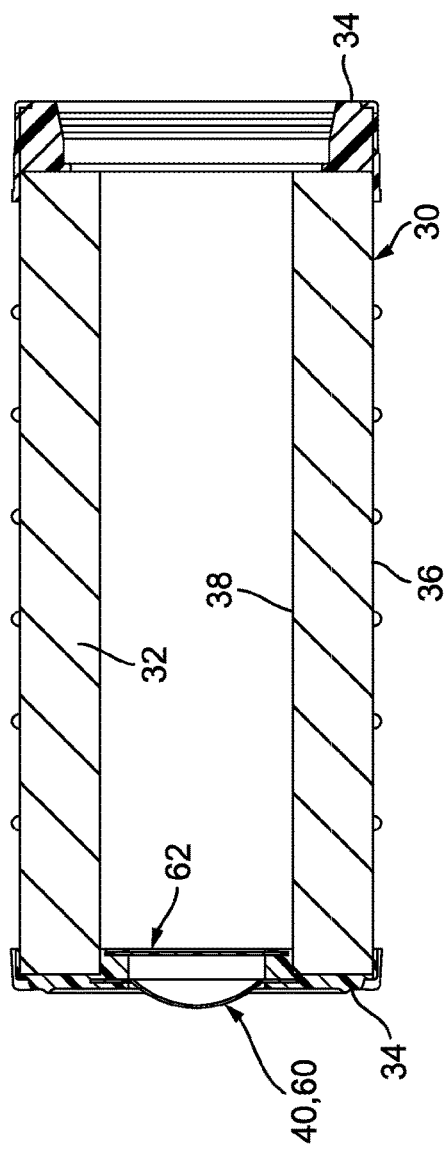
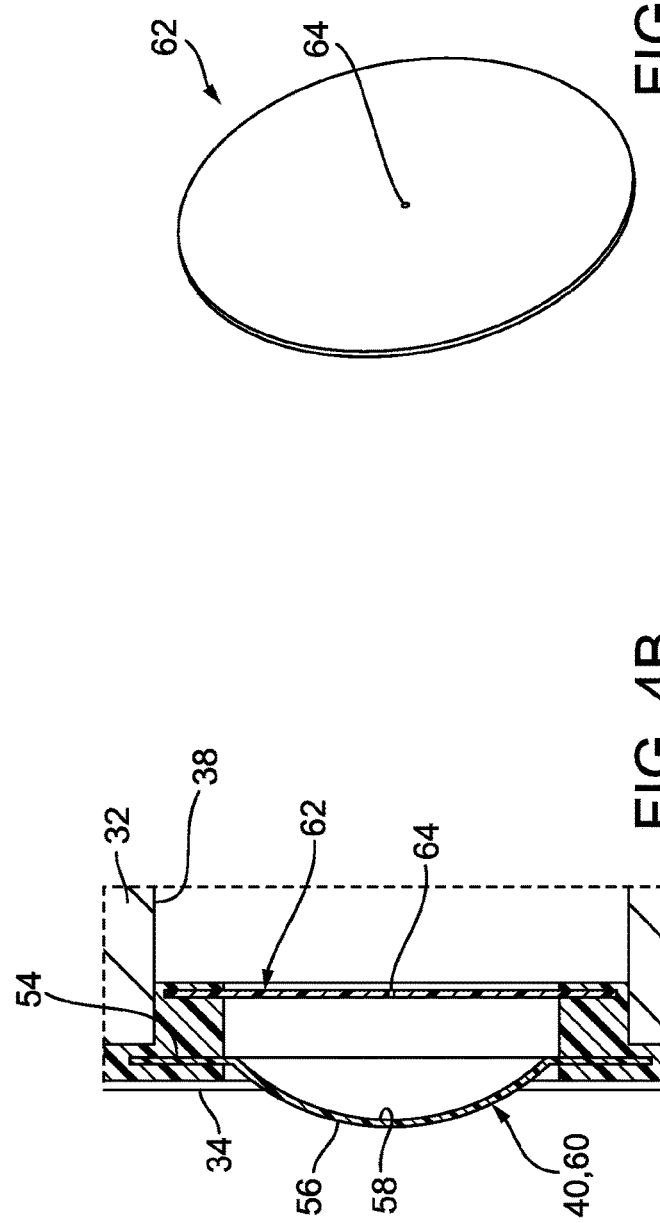

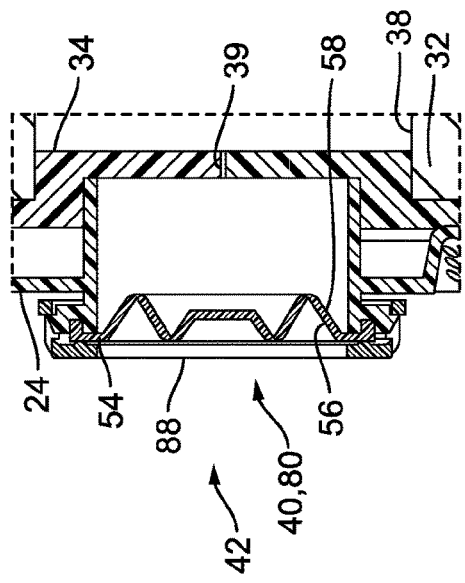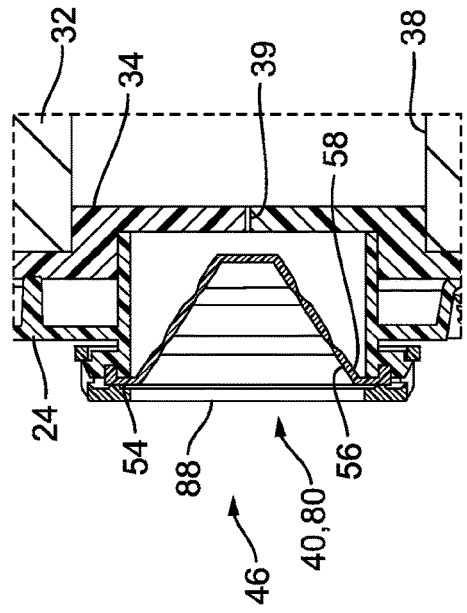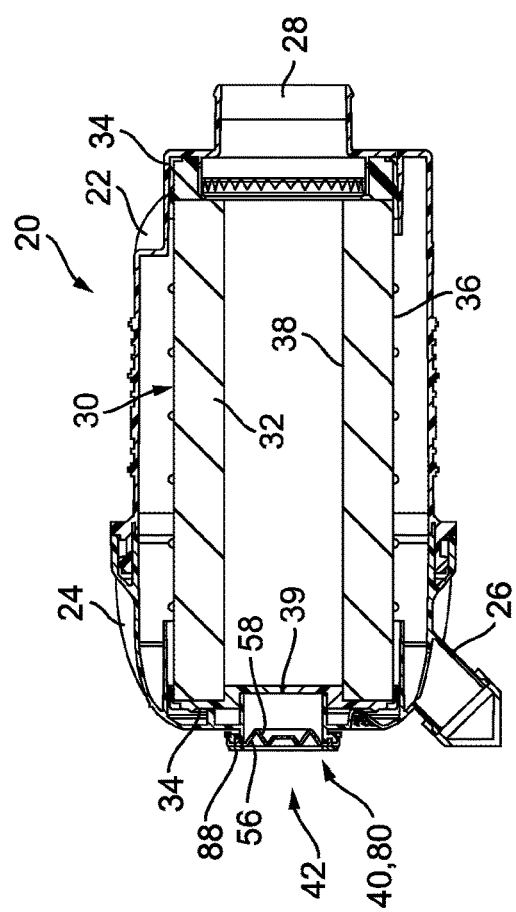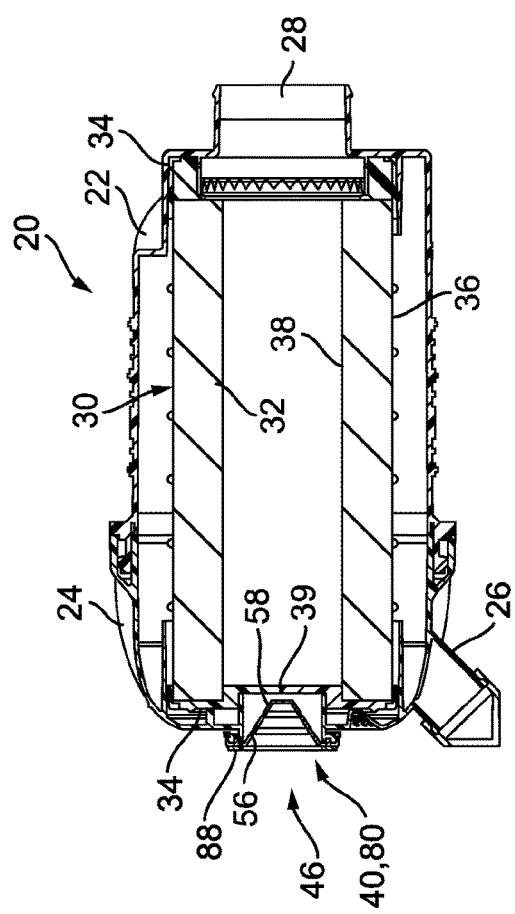

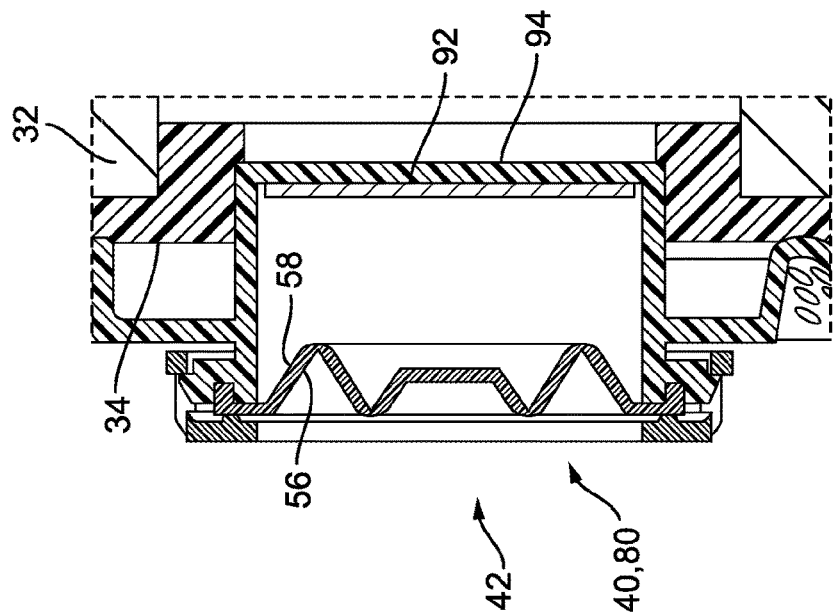
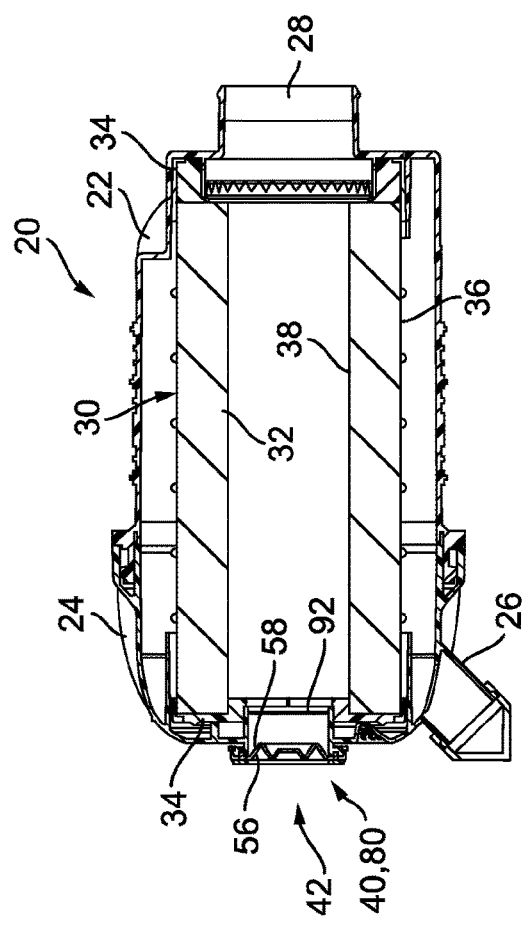
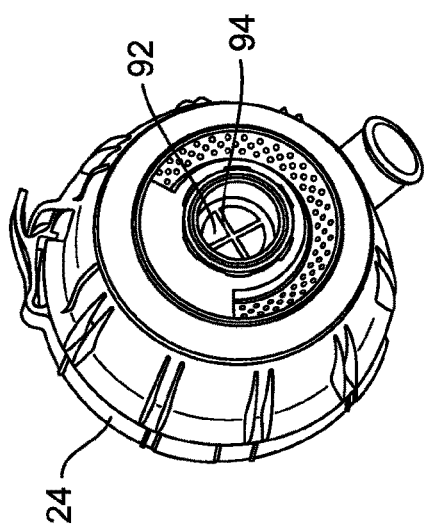
FIG. 12C
FIG. 12A
FIG. 12B

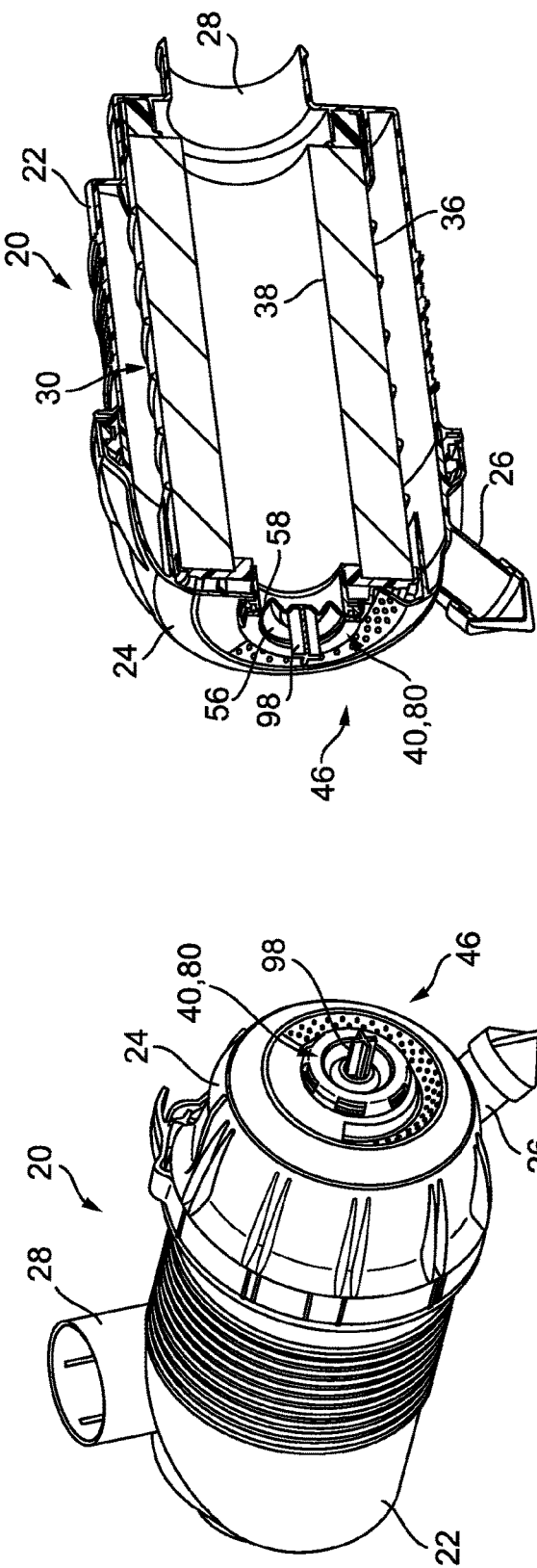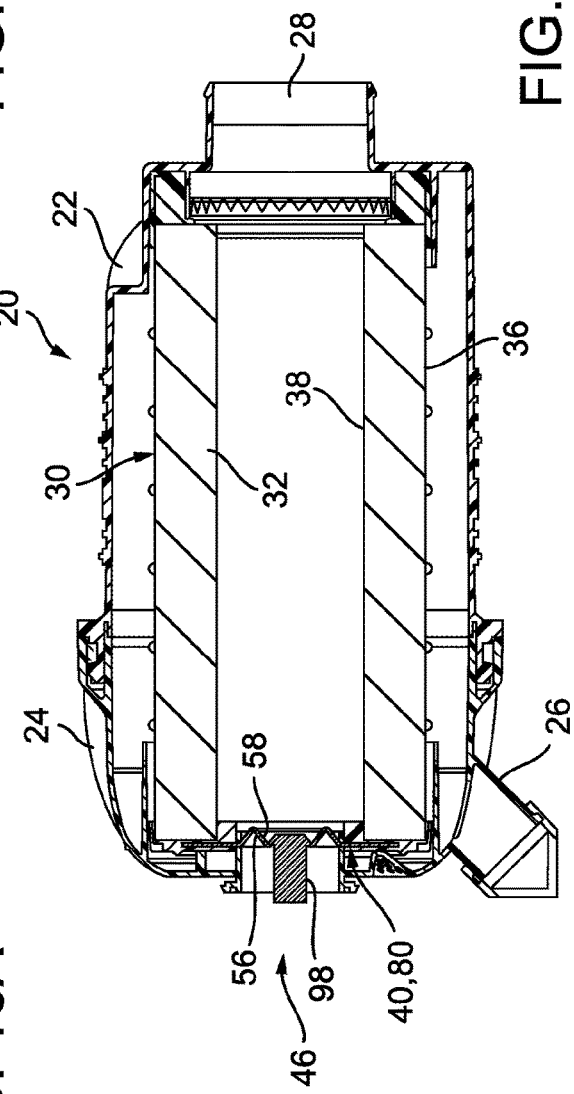

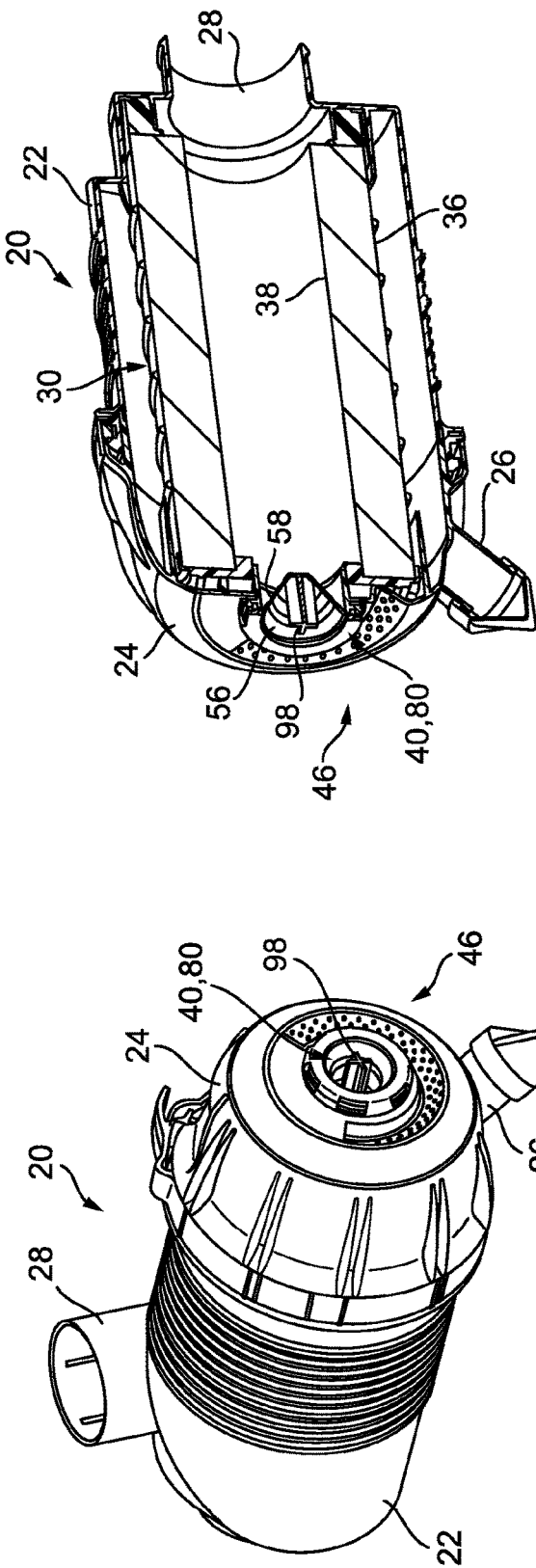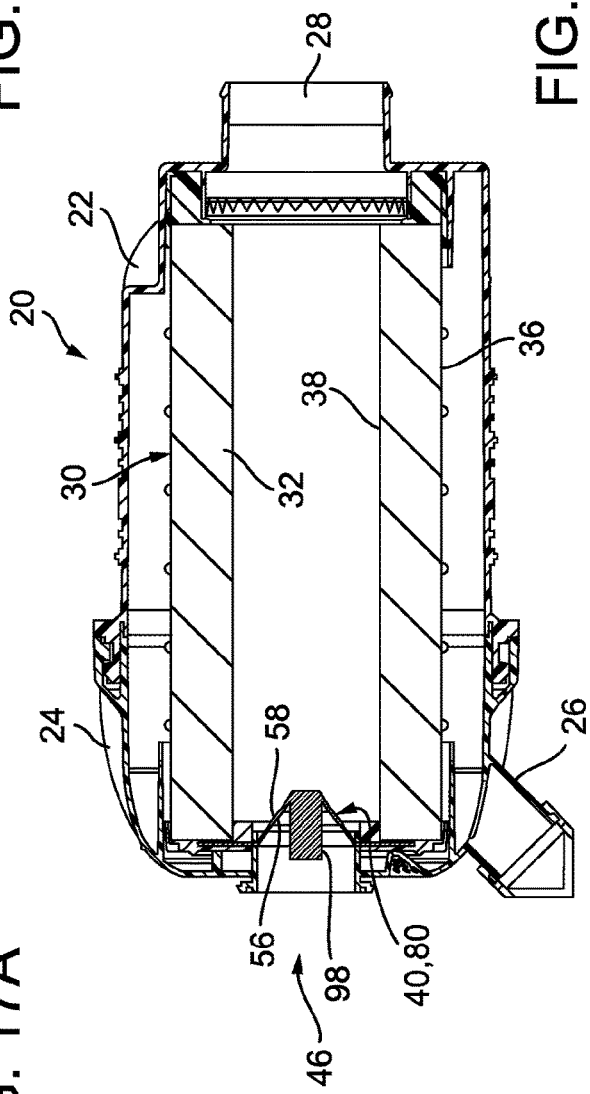

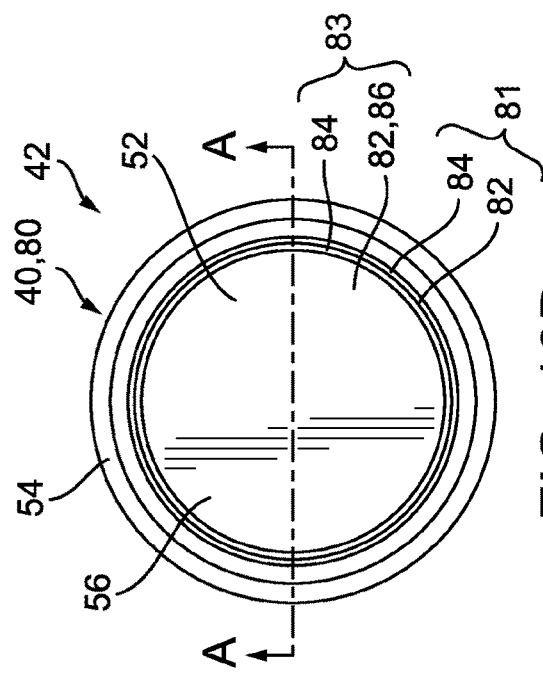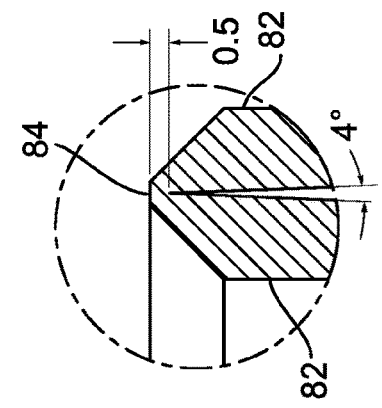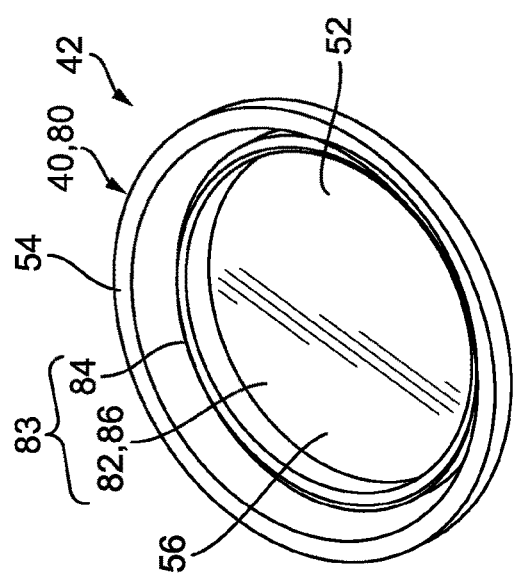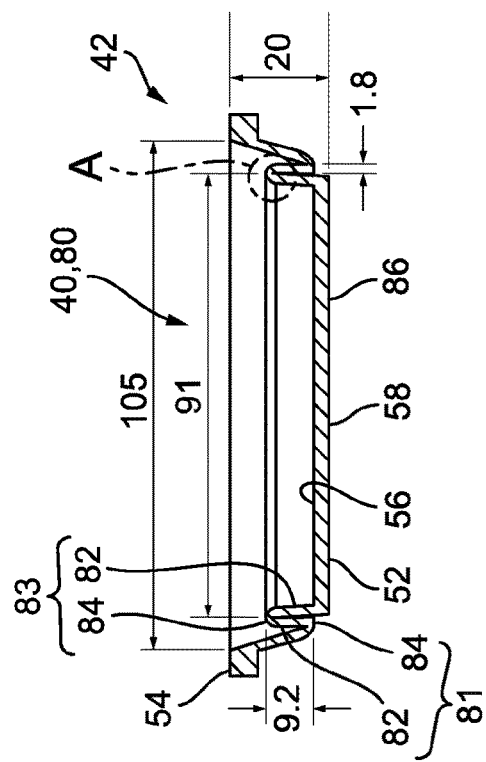

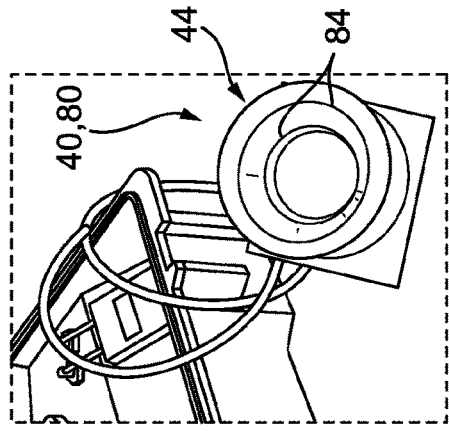
FIG. 19C
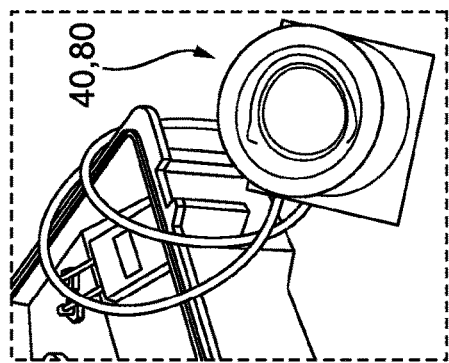
FIG. 19B
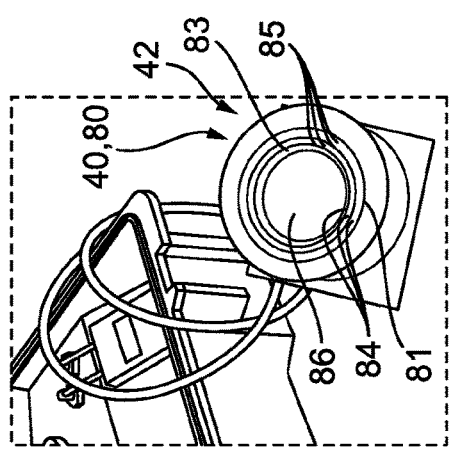
FIG. 19A
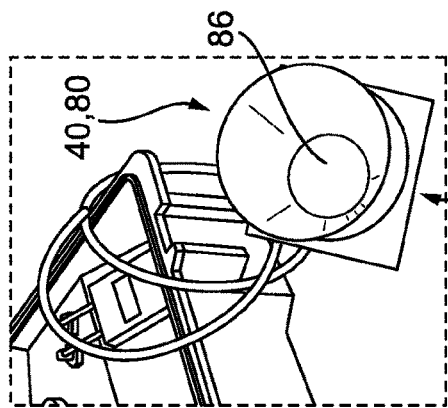
FIG. 19G
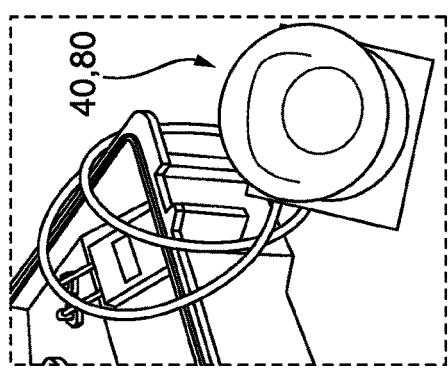
FIG. 19F
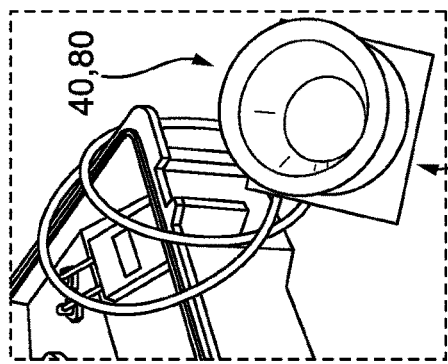
FIG. 19E
FIG. 19D

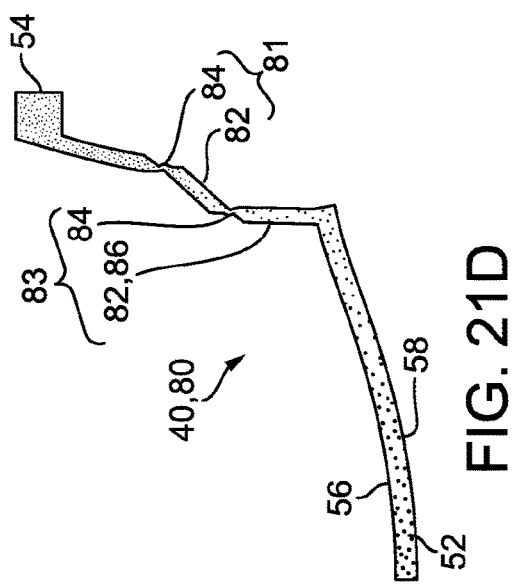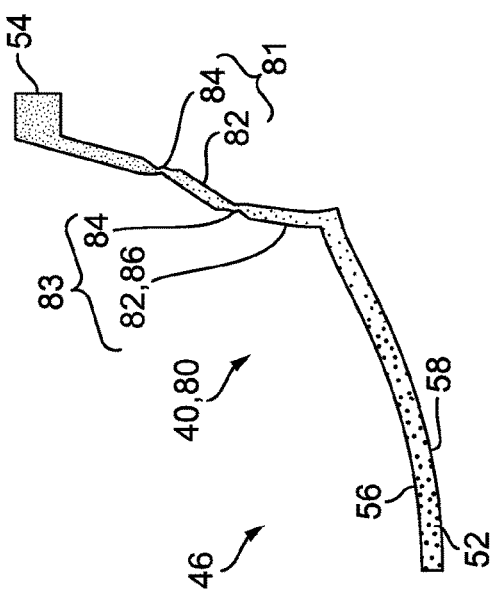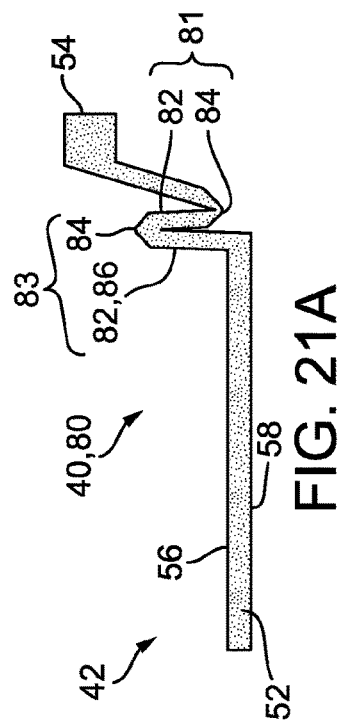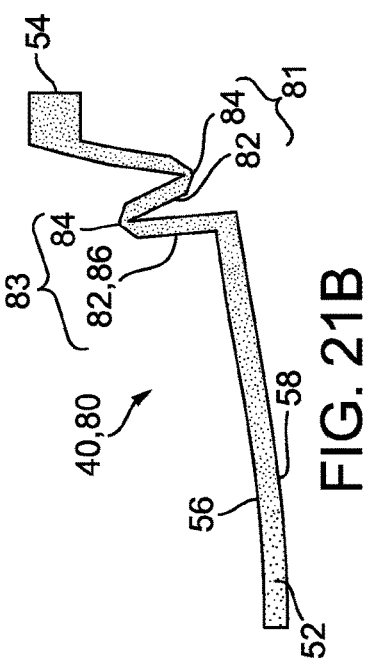

RESTRICTION INDICATOR DEVICE FOR FILTER ASSEMBLY

CROSS-REFERENCE TO RELATED PATENT APPLICATIONS

This application is a continuation of PCT Application No. PCT/US2019/039513, filed Jun. 27, 2019, which claims priority to and the benefit of U.S. Provisional Application No. 62/693,084, filed Jul. 2, 2018. The contents of these applications are hereby incorporated by reference in their entirety.

FIELD

The present invention relates generally to restriction indicator devices for filter assemblies.

BACKGROUND

After a certain amount of use, filter elements need to be replaced. However, in many conventional filter assemblies, it is typically very difficult to determine when the filter element needs to be replaced. Many filter elements do not have any pressure sensor or restriction indicator to indicate when the filter element should be replaced. Instead, the users simply replace the filter element on a regular basis, without testing for restriction, which may cause the filter element to be prematurely replaced, well before the end of the life of the filter element, since the user has no way of knowing the actual restriction and pressure drop across the filter element. Visual inspection of the amount of contaminant on the filter surface of the filter element is not reliable.

Some conventional filter elements include conventional restriction indicator devices that are typically placed downstream of the filter element and the filter assembly housing. These conventional restriction indicator devices are relatively expensive, take up a significant amount of space, and require a pressure port to be built or integrated into the filter assembly or downstream ducting. Furthermore, such conventional restriction indicator devices cause the filter assembly (in particular the housing of the filter assembly) to be substantially more complex and complicated (due to a large number of components and additional fittings and mold complications). Additionally, such conventional restriction indicator devices require at least periodic resetting.

Some conventional restriction indicator devices use a spring mechanism mounted on a fitting on the outlet tube of an air filter assembly. These conventional restriction indicator devices are typically reusable and require the user to reset the device at each filter replacement. Additionally, such devices are relatively expensive and require additional fittings to be added to the filter housing, thereby adding cost and complexity.

SUMMARY

Various embodiments provide for a filter element that comprises a filter media and a restriction indicator device. The restriction indicator device comprises an attachment portion and a movable portion. The attachment portion is attachable to a portion of the filter element. The movable portion is movable relative to the attachment portion between a non-buckled position and a buckled position. The movable portion moves from the non-buckled position to the buckled position once a predetermined pressure drop between an upstream side and a downstream side of the restriction indicator is met.

Various embodiments provide for a filter assembly that comprises a filter housing, a cover attachable to the housing, a filter element at least partially positionable within the filter housing and comprising a filter media, and a restriction indicator device comprising an attachment portion and a movable portion. The attachment portion is attachable to a portion of the filter element. The movable portion is movable relative to the attachment portion between a non-buckled position and a buckled position. The movable portion moves from the non-buckled position to the buckled position once a predetermined pressure drop between an upstream side and a downstream side of the movable portion of the restriction indicator device is met.

These and other features (including, but not limited to, retaining features and/or viewing features), together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 1A is a perspective view of a filter element with an indicator device according to one embodiment.

FIG. 1B is a cross-sectional view of the filter element of FIG. 1A.

FIG. 1C is a cross-sectional view of a portion of the filter element of FIG. 1A.

FIG. 1D is a perspective view of the indicator device of FIG. 1A.

FIG. 1E is a cross-sectional view of the indicator device of FIG. 1A.

FIG. 4A is a cross-sectional view of a filter element with an indicator device and an orifice plate according to another embodiment.

FIG. 4B is a portion of the filter element of FIG. 4A.

FIG. 4C is a perspective view of the orifice plate of FIG. 4A.

FIG. 10A is a cross-sectional view of the filter assembly of FIG. 9.

FIG. 10B is a cross-sectional view of a portion of the filter assembly of FIG. 9.

FIG. 11A is a cross-sectional view of the filter assembly of FIG. 9 in a buckled position.

FIG. 11B is a cross-sectional view of a portion of the filter assembly of FIG. 9 in the buckled position.

FIG. 12A is a perspective view of a filter assembly according to one embodiment.

FIG. 12B is a perspective view of a cover of the filter assembly of FIG. 12A.

FIG. 12C is a cross-sectional view of a portion of the filter assembly of FIG. 12A.

FIG. 16A is a perspective view of a filter assembly according to another embodiment in a non-buckled position.

FIG. 16B is a perspective, cross-sectional view of the filter assembly of FIG. 16A.

FIG. 16C is a cross-sectional view of the filter assembly of FIG. 16A.

FIG. 17A is a perspective view of the filter assembly of FIG. 16A in a buckled position.

FIG. 17B is a perspective, cross-sectional view of the filter assembly of FIG. 16A in the buckled position.

FIG. 17C is a cross-sectional view of the filter assembly of FIG. 16A in the buckled position.

FIG. 18A is a perspective view of an indicator device according to one embodiment.

FIG. 18B is a top view of the indicator device of FIG. 18A.

FIG. 18C is a cross-sectional view taken along line A-A of FIG. 18B.

FIG. 18D is a detail view of Detail A of FIG. 18C.

FIGS. 19A-19G are top views of an indicator device according to another embodiment moving from a non-buckled position to intermediate positions to a buckled position.

FIGS. 21A-21E are cross-sectional views of a portion of an indicator device according to still another embodiment in a FEA model moving from a non-buckled position to a buckled position.

DETAILED DESCRIPTION

Referring to the figures generally, various embodiments disclosed herein relate to a restriction indicator device within a filter assembly that is configured to buckle at a predetermined pressure drop, with such buckling indicating that the filter element of the filter assembly has reached its "terminal restriction" and should be replaced.

The restriction indicator device is low cost and provides a simple way of indicating that the filter element needs to be replaced. Accordingly, the restriction indicator device is configured to move from an original, non-buckled position to a buckled position according to a predetermined pressure drop (that is correlated to the terminal restriction of the filter element) in order to indicate when the filter element needs to be replaced. Once the restriction indicator has moved to the buckled position, the restriction indicator device provides a visual indication to the user that the filter element has reached its terminal restriction and therefore that the filter element should be replaced.

Filter Assembly

Figure 8A:
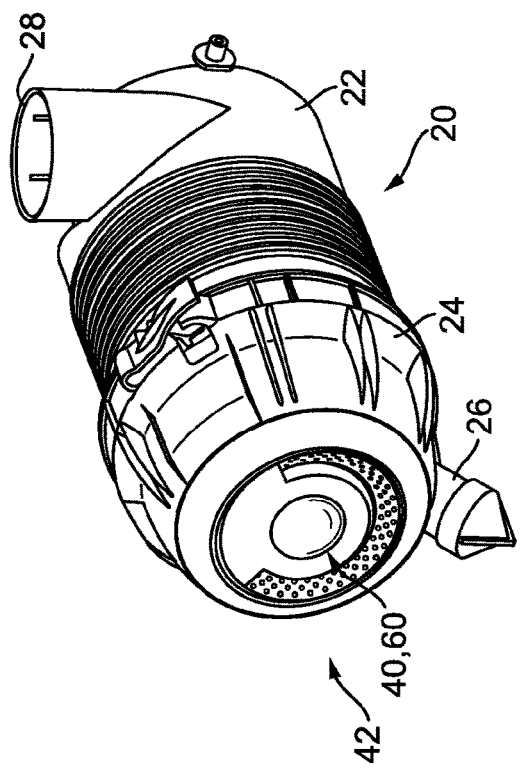
FIG. 8A is a perspective view of a filter assembly according to one embodiment.
Figure 8B:
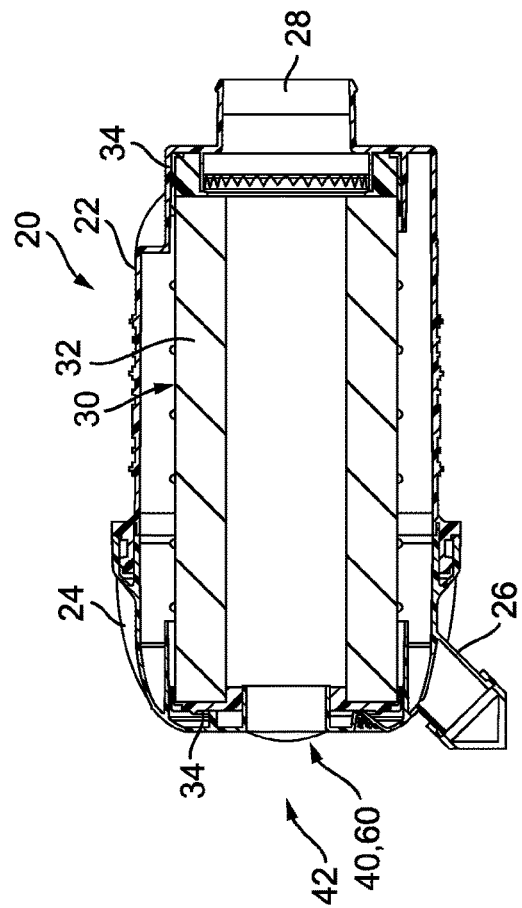
FIG. 8B is a cross-sectional view of the filter assembly of FIG. 8A.
Figure 9:
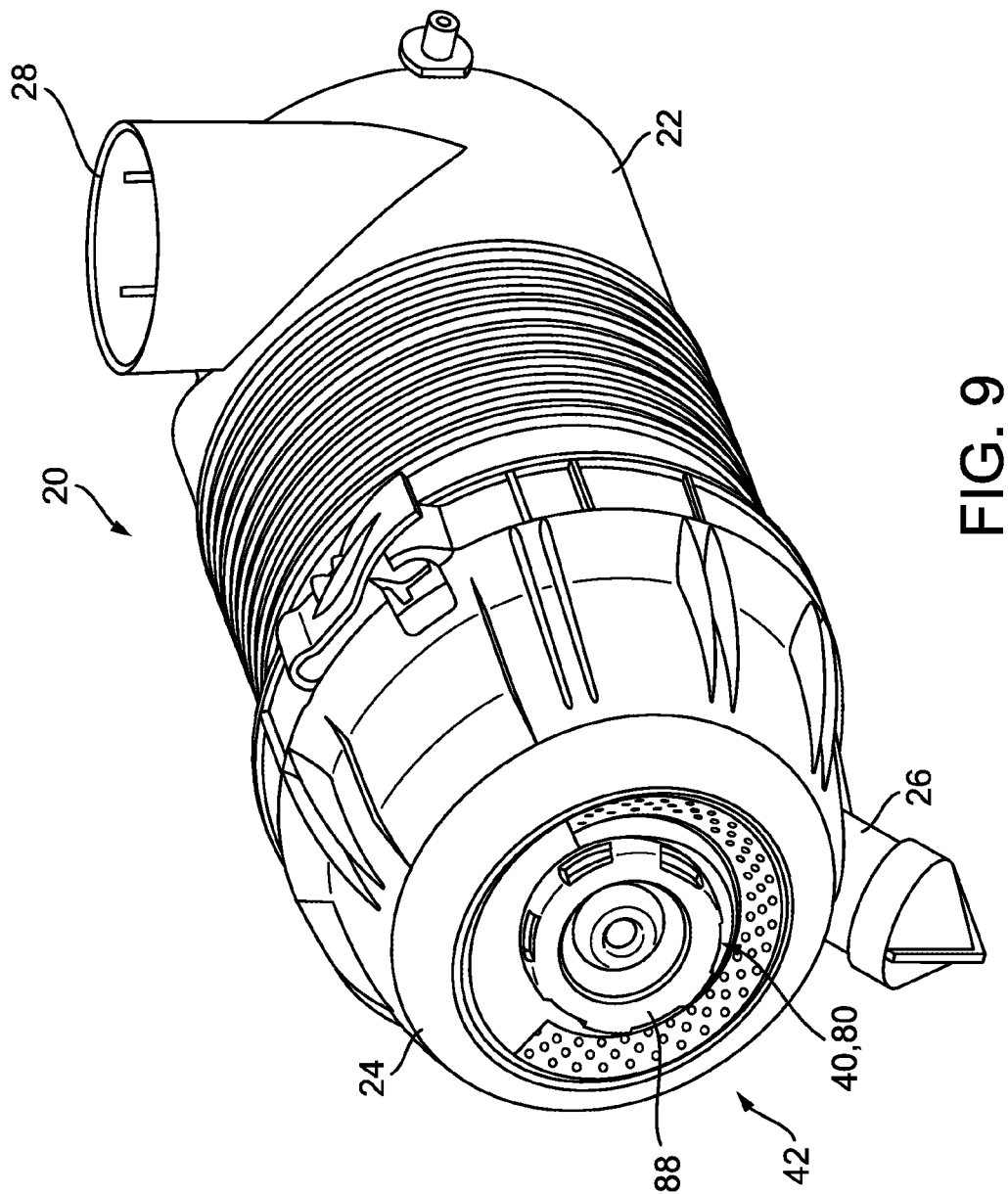
FIG. 9 is a perspective view of a filter assembly according to another embodiment in a non-buckled position.

A filter assembly 20 (as shown, for example, in FIGS. 8A, 9, and 16A) is provided that is configured to filter a fluid (e.g., air) and comprises filter element 30, a filter housing (referred to herein as "housing 22"), and a cover 24. The housing 22 and the cover 24 cooperate to contain or house the filter element 30. The housing 22 and the cover 24 are attachable together such that the cover 24 closes off at least one side of the housing 22. As described further herein, the filter assembly 20 also comprises a restriction indicator device 40.

The housing 22 and the cover 24 may comprise an inlet 26 and an outlet 28. The inlet 26 is configured to allow dirty fluid to enter into an inner area defined by the housing 22 and the cover 24 in order to move through and be filtered by the filter element 30. Once the fluid has moved through the filter element 30 and is thereby filtered, the outlet 28 is configured to allow clean fluid to exit out from the inner area defined by the housing 22 and the cover 24.

According to one embodiment, the filter assembly 20 may be a single-stage filter. Although air filtration is referred to herein (with the filter assembly 20 being an air filter assembly or an air cleaner), it is understood that the filter assembly 20 can be a variety of different types of filter assemblies.

Filter Element

Figure 22:
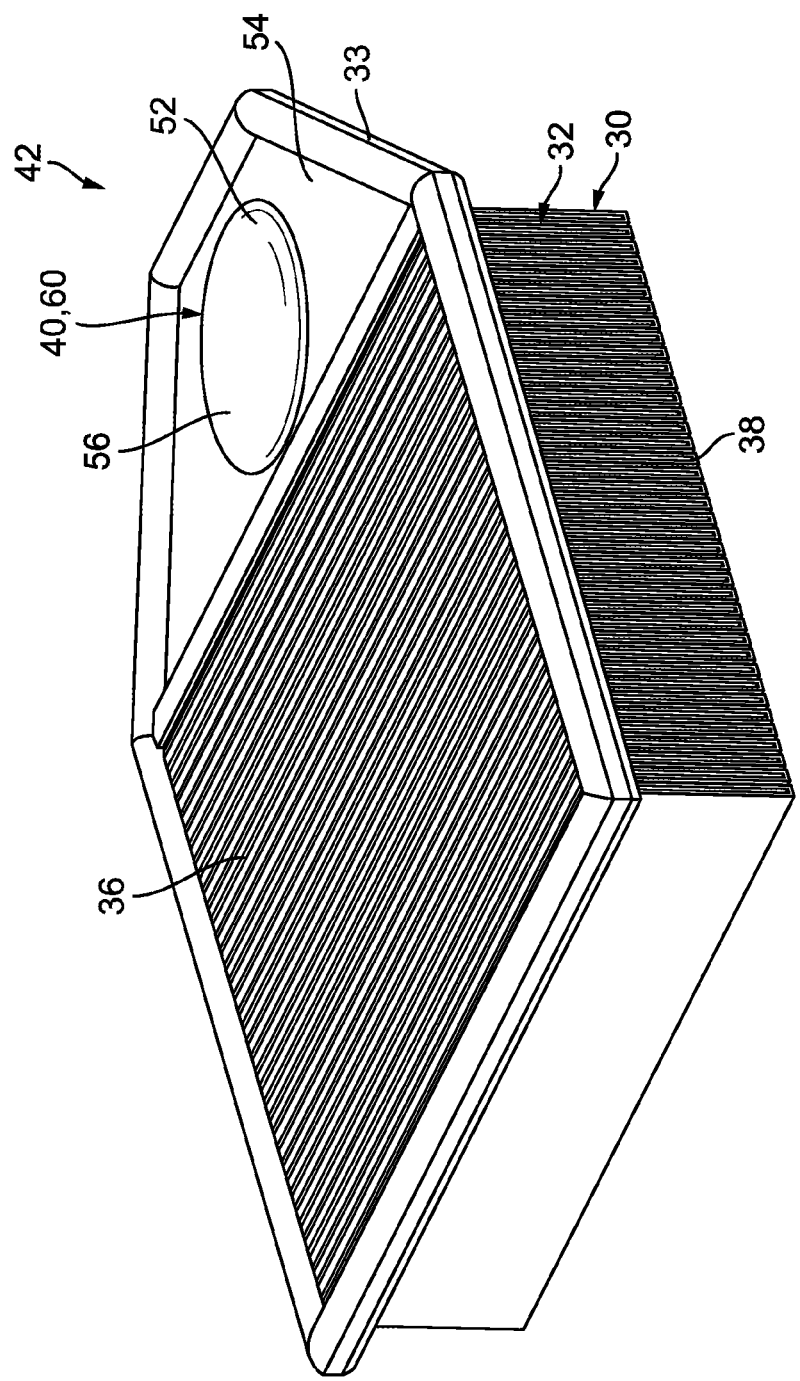
FIG. 22 is a perspective view of a filter element with an indicator device according to another embodiment.

The filter element 30 is at least partially positionable within the housing 22 (and/or the cover 24) and is configured to filter the fluid that enters into the filter assembly 20. Accordingly, the filter element 30 comprises a filter media 32 and may optionally include at least one endcap 34 (as shown in FIGS. 1A-1C, for example) and/or an attachment member 33 (as shown in FIG. 22 and described further herein). The filter media 32 is configured to filter the fluid. According to one embodiment as shown in FIGS. 1A-1C, the filter element 30 may be a cylindrical filter element (with a cylindrical filter media 32) that defines an inner area for fluid flow. According to another embodiment as shown in FIG. 22, the filter element 30 may be a flat or panel filter element (with a flat or panel filter media 32) and optionally may not include any endcaps. As described further herein, regardless of the configuration of the filter media 32, the indicator device 40 may be positioned along or next to one end of the filter media 32, such that one side of the indicator device 40 is fluidly directly connected to and affected by fluid along the upstream side 36 of the filter media 32 and the other side of the indicator device is fluidly directly connected to and affected by fluid along the downstream side 38 of the filter media 32.

As shown in FIGS. 1A-1C, the filter element 30 (in particular a cylindrical filter element) may comprise the endplate or endcap 34 is positioned along (and partially or completely covers) one end of the filter media 32. The filter element 30 may comprise two endcaps 34 positioned on opposite ends of the filter media 32 (e.g., a top endcap 34 and a bottom endcap 34). The endcaps 34 may optionally be constructed out of urethane.

Alternative to or in addition to the endcap 34, the filter element 30 (in particular a flat filter element 30) may comprise an attachment member 33 (as shown in FIG. 22) that attaches the indicator device 40 to the filter media 32. The attachment member 33 extends around at least a portion of the respective outer perimeters of the filter media 32 and the indicator device 40, thereby attaching the two. If the filter media 32 is substantially flat, the attachment member 33 may extend out from a side of the filter media 32 that extends between the upstream side 36 and the downstream side 38 of the filter media 32, thereby positioning the indicator device 40 along this side of the filter media 32. Accordingly, the indicator device 40 extends out from the filter media 32 along a plane that is substantially perpendicular to the direction of fluid flow through the filter media 32. The attachment member 33 may include the various features, configurations, and components of the endcap 34 (as described further herein), unless otherwise specified.

The filter element 30 comprises and defines an upstream side 36 and a downstream side 38. The upstream side 36 of the filter element 30 refers to the dirty and relatively high pressure side of the filter element 30 and is where the dirty fluid moves through prior to filtration. The downstream side 38 of the filter element 30 refers to the clean and relatively low pressure side of the filter element 30 and is where the clean fluid moves through after filtration. The difference in pressure between the upstream side 36 and the downstream side 38 creates a pressure drop across the filter element 30, which is affected by the amount of restriction across the filter media 32 of the filter element 30.

As the filter element 30 is used and filters a fluid, the filter element 30 accumulates dust, dirt, and other particulates, which increases the restriction across the filter element 30. Eventually, after a certain amount of dirt has accumulated on or within the filter element 30, the filter element 30 needs to be replaced or changed out for a new filter element 30. In particular, the filter element 30 needs to be replaced once the dirt on the filter element 30 reaches a terminal restriction, which is defined herein as a filter restriction level which causes the pressure difference, differential, drop, or loss across the filter element to reach a predetermined level.

Although the filter element 30 may be replaced once the filter element 30 reaches its terminal restriction, it is understood that the filter element 30 may optionally be configured to be cleaned, depending on the configuration of the filter element 30 and the entire filter assembly 20.

Restriction Indicator Device

A pressure or restriction gauge, gage, or indicator device 40 (as shown in FIGS. 1A-1E) provides a simple and easy way for the user to determine whether the filter element 30 has reached its terminal restriction. As shown in FIGS. 2A-3B, the indicator device 40 is configured to move from an original, non-buckled position 42 to a buckled position 46 at a particular, predetermined pressure drop that is correlated to or occurs at the filter element's terminal restriction (and thus is also correlated to the terminal pressure drop of the filter element 30) as the indicator device 40 gives in under applied compressive loads.

The non-buckled position 42 refers to the original shape of the indicator device 40 (and an original position of the movable portion 52 of the indicator device 40 relative to the attachment portion 54 of the indicator device 40) under a normal pressure drop. The movable portion 52 extends further upstream in the non-buckled position 42 than in the buckled position 46. In the non-buckled position 42 (in the embodiments of FIGS. 2A-3B), the movable portion 52 is closer to the upstream side 36 of the filter media 32 (and further from the downstream side 38 of the filter media 32). The buckled position 46 refers to an altered shape of the indicator device 40 (relative to its original shape) and a moved position (relative to its original position) of the movable portion 52 of the indicator device 40 relative to the attachment portion 54 of the indicator device 40 (and relative to the filter media 32) as a result of an increased pressure drop across the indicator device 40 (and therefore also across the filter media 32). In the buckled position 46 (as shown in FIGS. 2A-3B), the movable portion 52 is closer to the downstream side 38 of the filter media 32 (and further from the upstream side 36 of the filter media 32). The indicator device 40 is positioned and shaped such that, in order for fluid to move from the upstream side 36 to the downstream side 38 of the filter media 32, the fluid has to flow through the filter media 32 (and cannot flow through alternate paths). In particular, the fluid cannot flow through the indicator device 40 such that the upstream surface 56 and the downstream surface 58 of the indicator device 40 are fluidly separate from each other, except through the filter media 32.

Accordingly, when installed in the filter assembly 20, the indicator device 40 moves from the non-buckled position 42 to the buckled position 46 when once the predetermined pressure drop is reached within the filter element 30, which is caused by the filter element 30 reaching its terminal restriction. When the indicator device 40 is in the buckled position 46, the indicator device 40 creates a visual indication (either directly along the indicator device 40 or indirectly at a separate activatable device 76) to the user that the filter element 30 has had a certain pressure drop between its upstream side 36 and its downstream side 38 (i.e., the predetermined pressure drop), and therefore that the filter element 30 has reached a terminal restriction, has reached or is nearing the end of its life, and should be replaced.

Accordingly, the indicator device 40 provides a binary indication to the user regarding whether the filter element 30 needs to be replaced, which is very easy for the user to understand. In particular, the non-buckled position 42 indicates that the filter element 30 does not need to be replaced, while the buckled position 46 indicates that the filter element 30 does need to be replaced.

The indicator device 40 (in particular the movable portion 52) comprises an upstream side or surface 56 and a downstream side or surface 58. The upstream surface 56 and the downstream surface 58 are directly exposed to respective air volumes on opposite sides of the filter media 32, are substantially opposite each other, and are on opposite sides of a movable portion 52 (discussed further below). The indicator device 40 is positioned relative to the filter element 30 such that the upstream surface 56 of the indicator device 40 is positioned along the upstream side 36 of the filter media 32 and is directly exposed to the air volume along the high-pressure, upstream side 36 of the filter media 32, which may be atmospheric air. Furthermore, the downstream surface 58 of the indicator device 40 is positioned along the downstream side 38 of the filter media 32 and is subject to and directly exposed to the air volume along the low-pressure, downstream side 38 of the filter media 32. In a configuration in which the fluid to be filtered flows outside-in to the filter element 30 during filtration (such that the outside of the filter media 32 is the upstream side 36 and the inside of the filter media 32 is the downstream side 38), the upstream surface 56 of the indicator device 40 is positioned along the outer surface of the filter element 30 and faces away from the inner area defined by the filter element 30 (i.e., faces toward an area outside of the filter media 32). Accordingly, the downstream surface 58 of the indicator device 40 is positioned along the inner surface of the filter element 30 and faces toward the inner area defined by the filter element 30. However, it is understood that this configuration may be reversed (in which the fluid to be filtered flows inside-out from the filter element 30 during filtration).

The indicator device 40 also comprises the movable portion 52 and an attachment portion 54. The movable portion 52 of the indicator device 40 is configured to collapse, buckle, or otherwise move (relative to the attachment portion 54 and the filter element 30) between the non-buckled position 42 and the buckled position 46. In particular, the movable portion 52 is configured to move from non-buckled position 42 to the buckled position 46 once a certain or predetermined pressure drop across the movable portion 52 (between the upstream surface 56 and the downstream surface 58) is reached.

The attachment portion 54 is configured to attach the indicator device 40 (in particular the movable portion 52) to a certain portion of the filter assembly 20, such as to the filter element 30 (in particular the filter media 32 and/or the endcap 34) or the cover 24. The attachment portion 54 attaches and seals to the certain part of the filter assembly 20 such that the upstream surface 56 and the downstream surface 58 of the indicator device 40 are fluidly separate from each other, except through the filter media 32, which allows the movable portion 52 to be susceptible to the pressure drop across the filter element 30. As shown in FIG. 1D, the attachment portion 54 may be a flange that extends substantially around the outer edge of the movable portion 52 along a plane that is substantially perpendicular to the direction of movement of the movable portion 52 between the non-buckled position 42 and the buckled position 46. According to one embodiment, the attachment portion 54 may be molded to a portion of the filter assembly 20.

In the original or initial non-buckled state or position 42, the filter media 32 possess a restriction/contamination level that is generally considered acceptable for continued operation with satisfactory performance. Accordingly, the restriction and the pressure drop across the filter media 32 (and across the indicator device 40) is relatively low. In the non-buckled position 42, the movable portion 52 is relatively further away from the downstream side 38 of the filter element 30 than in the buckled position 46. Accordingly, if the inner area of the filter media 32 is the downstream side 38 of the filter media 32, the movable portion 52 extends away from or is positioned relatively further out from the inner area of the filter media 32 in the non-buckled position 42 (compared to in the buckled position 46).

Figures 2A, 2B, 2C:
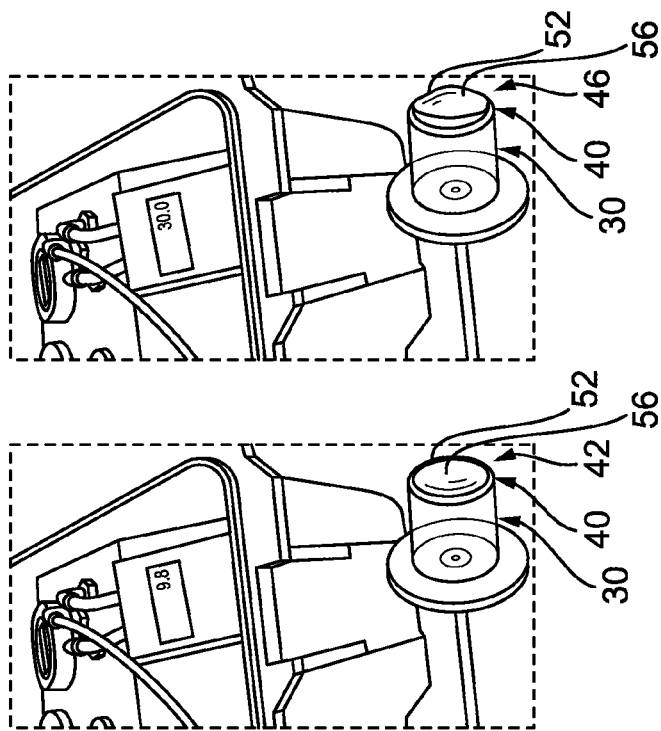
FIG. 2A is an indicator device according to one embodiment in a non-buckled position.
FIG. 2B is the indicator device of FIG. 2A in an intermediate position.
FIG. 2C is the indicator device of FIG. 2A in a buckled position.

As the filter media 32 becomes contaminated during use (e.g., becomes loaded with dust, dirt, and other particulates), the restriction, and therefore the pressure drop, across the filter element 30 (and across the indicator device 40) increases. At a certain level of restriction (corresponding to a certain level of contamination), the pressure drop across the indicator device 40 reaches a predetermined level (i.e., the terminal pressure drop of the filter element 30), meaning that the filter performance has fallen below what is considered to be an acceptable level. This causes the movable portion 52 to buckle or collapse toward the low pressure volume (i.e., toward the downstream side 38) due to the large pressure drop between the upstream surface 56 and the downstream surface 58, thereby moving the indicator device 40 from the original, non-buckled position 42 to the buckled position 46. Optionally, the indicator device 40 may move through a partially buckled, intermediate position 44 (as shown in FIG. 2B) that is between the non-buckled position 42 and the buckled position 46, with such position indicating that the filter performance is approaching a minimum level of acceptability.

In the buckled state or position 46, the movable portion 52 extends further downstream and is relatively closer to the downstream side 38 of the filter element 30 than in the non-buckled position 42. Accordingly, if the inner area of the filter media 32 is the downstream side 38 of the filter media 32, the movable portion 52 extends or is buckled inward toward the inner area of the filter media 32 in the buckled position 46. This movement of the movable portion 52 provides a visual indication to the user (who can see that the movable portion 52 is in the buckled position 46 and/or can see that a separate activatable device 76 is activated) that the filter element 30 needs to be replaced. The indicator device 40 may optionally be configured such that, once the indicator device 40 moves into the buckled position 46, the indicator device 40 does not automatically recover back into the non-buckled position 42, even if the pressure drop subsequently decreases.

According to the desired configuration, the indicator device 40 may have a variety of different shapes that allow the indicator device 40 to buckle or collapse into the buckled position 46 as a result of the predetermined pressure drop. For example, the indicator device 40 may have a dome shape as a dome indicator device 60 (as shown in FIGS. 1A-5C, 8A-8D, and 15A-15B) or a stepped-conical shape as a stepped-conical indicator device 80 (as shown in FIGS. 6A-7D, 9-14, and 16A-21E), as described further herein.

The indicator device 40 is constructed as a single-piece. Accordingly, the indicator device 40 comprises a single unitary component that cannot be separated without destruction. For example, the indicator device 40 may be constructed as a single, integral molded part, which allows the indicator device 40 to be very low cost.

As described further herein, the indicator device 40 may be attached to or a part of a variety of different components within the filter assembly 20, such as to the filter element 30 or the cover 24 of the filter assembly 20. If the indicator device 40 is attached to or a part of the filter element 30, the housing 22 and/or the cover 24 of the filter assembly 20 may comprise clear or open portions in order to allow the position of the indicator device 40 to be seen or visible without removing any portion of the filter assembly 20. Alternatively, at least a portion of the housing 22 or the cover 24 may be removed in order to allow the user to view the position of the indicator device 40. In a different implementation, the filter assembly 20 may not comprise a housing 22 or may comprise a transparent (or substantially transparent) at a portion thereof, both of which allow the user to easily see the position of the indicator device 40. Additionally, the indicator device 40 may be positioned along the upstream side 36 of the filter element 30 or along the downstream side 38 of the filter element 30.

According to one embodiment, the indicator device 40 may be a disposable and not-reusable component that may be integrated into the filter element 30 (and disposed with the filter element 30) and is permanently deformed when the indicator device 40 moves from the non-buckled position 42 into the buckled position 46 such that the indicator device 40 cannot be moved back from the buckled position 46 to the non-buckled position 42. Accordingly, by moving into the buckled position 46, the indicator device 40 becomes permanently ruined the function of the indicator device 40, which prevents the user from ever recovering the indicator device 40 back into the non-buckled position 42 from the buckled position 46.

According to another embodiment, the indicator device 40 may be a reusable component that is integrated into the cover 24 or the housing 22 of the filter assembly 20 and is temporarily deformed when the indicator device 40 moves from the non-buckled position 42 into the buckled position 46 such that the indicator device 40 can be moved back from the buckled position 46 to the non-buckled position 42. Accordingly, the indicator device 40 is configured such that the movable portion 52 can be moved or pushed back out from the buckled position 46, thereby recovering the indicator device 40 and returning the indicator device 40 completely back into the non-buckled position 42 from the buckled position 46. The indicator device 40 can subsequently be successfully used again to indicate when the predetermined pressure drop has been met.

The indicator device 40 may be constructed out of a variety of different materials such that at least a portion of the indicator device 40 is flexible in order to be movable or collapsible from the non-buckled position 42 to the buckled position 46. For example, the indicator device 40 may constructed out of plastic, liquid silicone rubber, a thermoplastic, a thermoplastic elastomer, and/or an elastomer.

The filter assembly 20 may comprise one or multiple indicator devices 40, depending on the desired configuration. According to one embodiment, the filter assembly 20 may comprise multiple indicator devices 40 (such as at least two indicator devices 40) that are each configured to move from the non-buckled position 42 to the buckled position 46 at different predetermined pressure drops. For example, the filter assembly 20 may comprise a first indicator device 40 that is configured to move into the buckled position 46 at approximately 75% of the terminal restriction of the filter element 30 and a second indicator device 40 that is configured to move into the buckled position 46 at approximately 100% of the terminal restriction of the filter element 30. This configuration provides the user with an early warning that the filter element 30 is nearing the end of its life and will need to replaced soon (i.e., when the first indicator device 40 moves into the buckled position 46), while still providing an accurate indication of exactly when the filter element 30 needs to be replaced (i.e., when the second indicator device 40 moves into the buckled position 46). The first and second indicator devices 40 may be separate from each other (e.g., side-by-side or next to each other). Alternatively, the first and second indicator devices 40 may be superimposed on top of each other. For example, a dome indicator device 60 may be integrated onto another dome indicator device 60. Alternatively or additionally, the stepped-conical indicator device 80 may have multiple positions to indicate how soon the filter element 30 will need to be replaced (as shown in FIGS. 19A-19G).

Dome Indicator Device Structure

One embodiment of the indicator device 40 is shown in FIGS. 1A-1E in which the indicator device 40 is a dome indicator device 60. The dome indicator device 60 may be a simple dome piece in which the movable portion 52 is shaped as a rounded dome that is extended out toward the upstream side 36 of the filter element 30 in the non-buckled position 42. Accordingly, the upstream surface 56 of the movable portion 52 of the dome indicator device 60 has a domed, hemispherical, convex shape (relative to the upstream side 36 of the filter element 30) (and therefore the downstream surface 58 of the movable portion 52 has a concave shape) in the non-buckled position 42, as shown in FIGS. 1A-1E, 2A, and 3A.

Figures 3A, 3B:
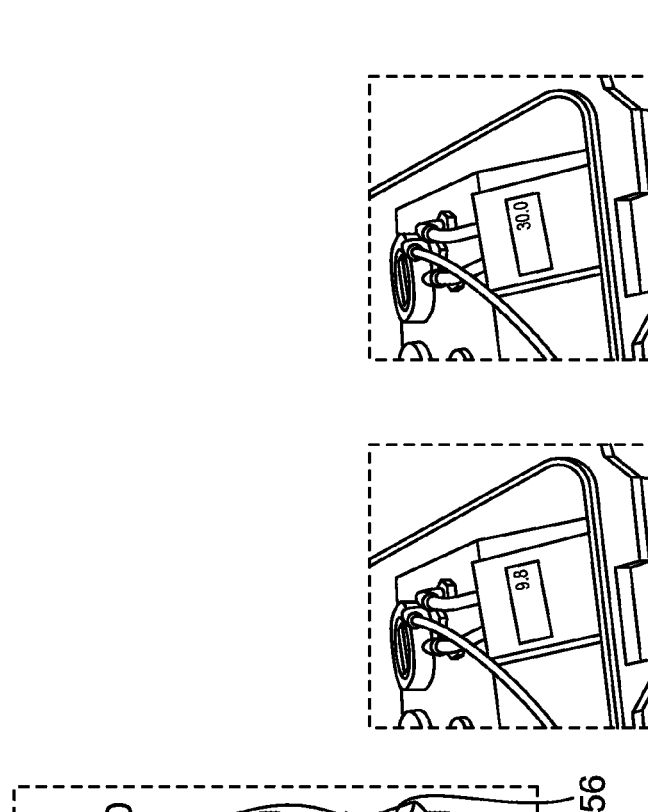
FIG. 3A is an indicator device according to another embodiment in a non-buckled position.
FIG. 3B is the indicator device of FIG. 3A in a buckled position.

In the buckled position 46, the upstream surface 56 of the movable portion 52 of the dome indicator device 60 has a buckled, collapsed, concave shape (relative to the upstream side 36 of the filter element 30) (and therefore the downstream surface 58 of the movable portion 52 has a convex shape), as shown in FIGS. 2C and 3B. Accordingly, the movable portion 52 creates a "dish shape" with the attachment portion 54 in the buckled position 46.

The dome indicator device 60 of FIGS. 1A-1E may be attached to (e.g., embedded, molded, or over-molded into) a center portion of one of the endcaps 34 of the filter element 30 such that the inner surface (e.g., the downstream surface 58) of the dome indicator device 60 is exposed to the inner area defined by the filter media 32, and the outer surface (e.g., the upstream surface 56) of the dome indicator device 60 is exposed to the outer area, outside of the filter media 32. The center portion of the endcap 34 may be a center aperture or through-hole that extends completely through the endcap 34. Accordingly, the dome indicator device 60 closes off the aperture of the endcap 34.

Orifice Plate

Another embodiment of the indicator device 40 is shown in FIGS. 4A-4C, the filter assembly 20 further comprises an orifice plate 62 that is positioned on the downstream side of the indicator device 40 (e.g., positioned along and between (thereby fluidly separating except through the orifice 64) the downstream surface 58 of the movable portion 52 of the indicator device 40 and the downstream side 38 of the filter element 30).

The orifice plate 62 comprises a substantially flat disc defining a small, fluidly-restrictive aperture, hole, or orifice 64 (e.g., a pin hole) in the center (that extends completely through the orifice plate 62) and may also be molded into the same endcap 34 of the filter element 30 that the indicator device 40 is molded into. The orifice plate 62 closes off and fluidly separates the downstream surface 58 of the indicator device 40 from the downstream side 38 of the filter media 32 such that fluid can only flow through the orifice 64 to move between the respective areas along the downstream surface 58 of the indicator device 40 and the downstream side 38 of the filter media 32. The orifice plate 62 may extend along a plane that is substantially perpendicular to the direction of movement of the movable portion 52. The orifice plate 62 may be constructed out of a variety of different materials, including but not limited to plastic. The diameter of the orifice 64 is significantly smaller than the diameter of the disc of the orifice plate 62 and may be approximately 0.2 to 2 millimeters (mm).

Due to the small size of the orifice 64, the orifice 64 is restrictive, which prevents fluid (e.g., air mass) from moving quickly through the orifice 64 and only allows a small flow rate of fluid to move through the orifice 64. Accordingly, due to the small orifice 64, the orifice plate 62 damps, smooths, or evens out any large transient pressure spikes or pulses or dramatic pressure fluctuations that may result from various transient engine behavior, which prevents the indicator device 40 from preemptively moving into the buckled position 46 due to a brief and temporary spike in pressure drop.

Additionally, the orifice plate 62 provides additional protection and acts as a safety mechanism in case the indicator device 40 breaks, cracks, fails, or ruptures during use, thereby resulting in a leak between the upstream surface 56 and the downstream surface 58 of the indicator device 40. If the indicator device 40 breaks, the orifice plate 62 only allows a small amount of "dirty" fluid (e.g., dusty air) to bypass the filter element 30 and flow slowly through the orifice 64 and into the downstream side 38 of the filter element 30 (and eventually to the engine) due to the small size of the orifice 64.

Indicator Device and Endcap of the Filter Element

Figure 5C:
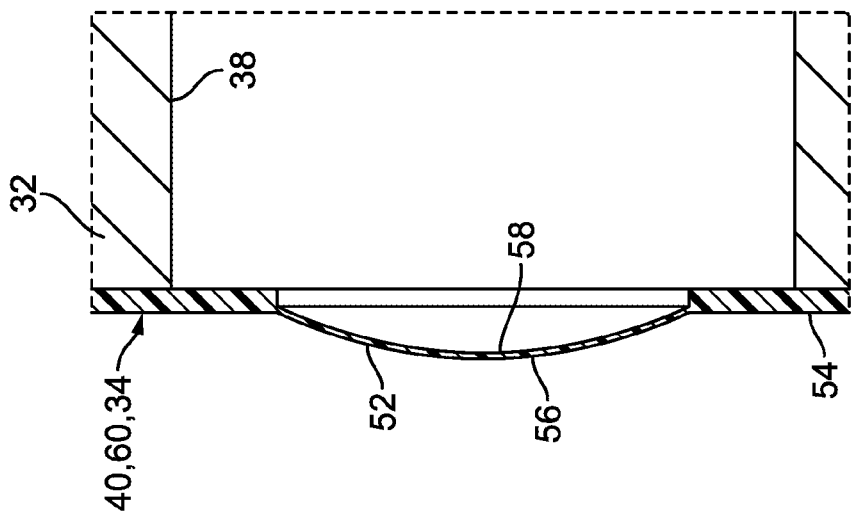
FIG. 5C is a cross-sectional view of a portion of the filter element of FIG. 5A.
Figure 5A:
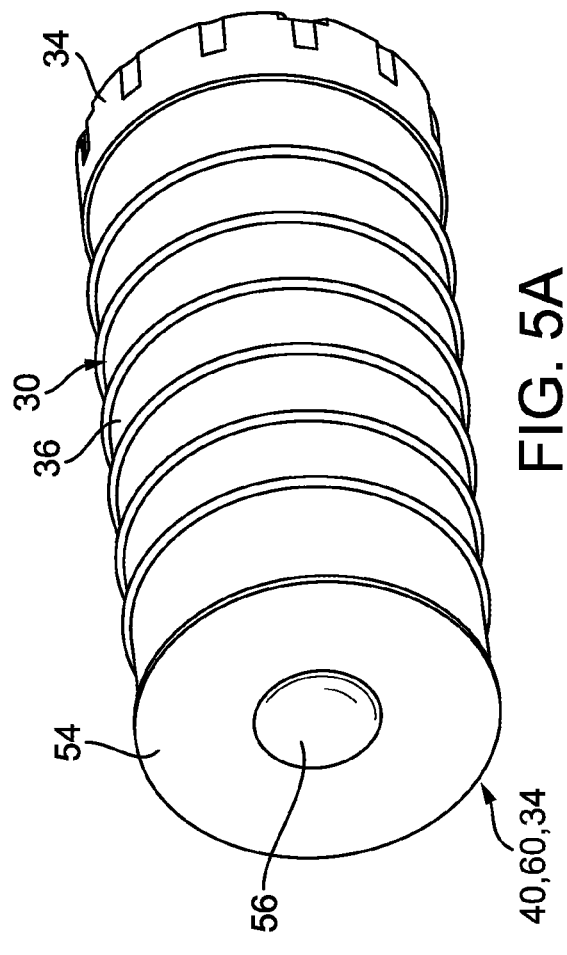
FIG. 5A is a perspective view of a filter element with an indicator device according to yet another embodiment.
Figure 5B:
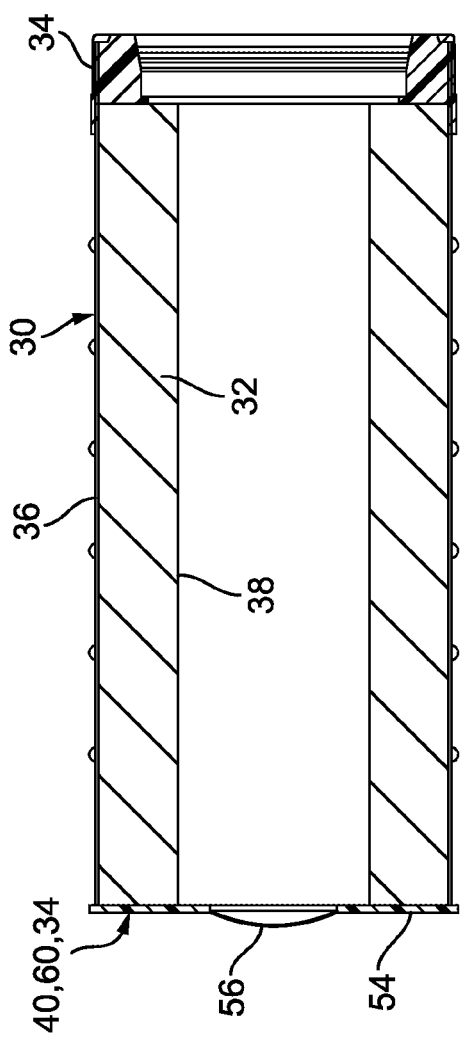
FIG. 5B is a cross-sectional view of the filter element of FIG. 5A.

Another embodiment of the indicator device 40 is shown in FIGS. 5A-5C, in which the indicator device 40 is integrated into the filter element 30. In particular, the indicator device 40 and one of the endcaps 34 of the filter element 30 are constructed together as a single-piece (and the indicator device 40 is integrated into one of the endcaps 34). Accordingly, the indicator device 40 and one of the endcaps 34 comprise a single unitary component that cannot be separated without destruction. For example, the indicator device 40 and one of the endcaps 34 may be constructed as a single, integral molded part.

The indicator device 40 and one of the endcaps 34 can be formed with injection molding or thermoforming, for example. The indicator device 40 and one of the endcaps 34 can be attached to the filter media 32 through the attachment portion 54 and with, for example, an adhesive or by embedding the attachment portion 54 and the filter media 32 together.

Stepped-Conical Indicator Device Structure

Another embodiment of the indicator device 40 is shown in FIGS. 6A-7D, in which the indicator device 40 is a stepped-conical indicator device 80. The movable portion 52 of the stepped-conical indicator device 80 has a non-uniform thickness in order to facilitate cylindrical folding or pleating in certain locations (in the non-buckled position 42) and telescoping (in the buckled position 46). With the stepped-conical indicator device 80, the non-bucked position 42 is a non-collapsed position, and the buckled position 46 is a collapsed position. Accordingly, the stepped-conical indicator device 80 collapses as it moves from the non-buckled position 42 to the buckled position 46.

Figure 6C:
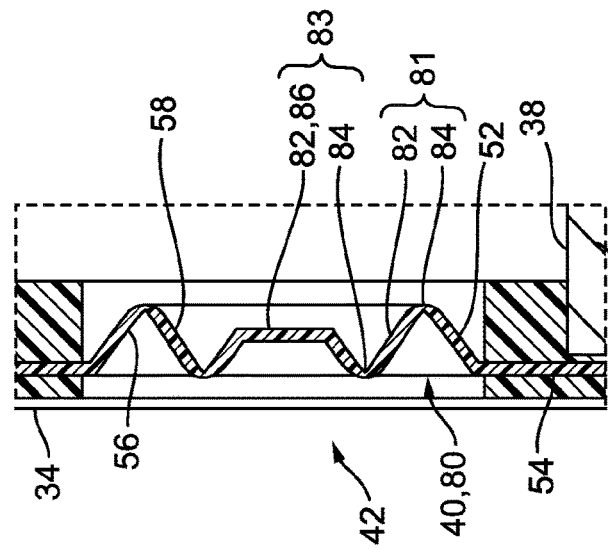
FIG. 6C is a cross-sectional view of a portion of the filter element of FIG. 6A.
Figure 6D:
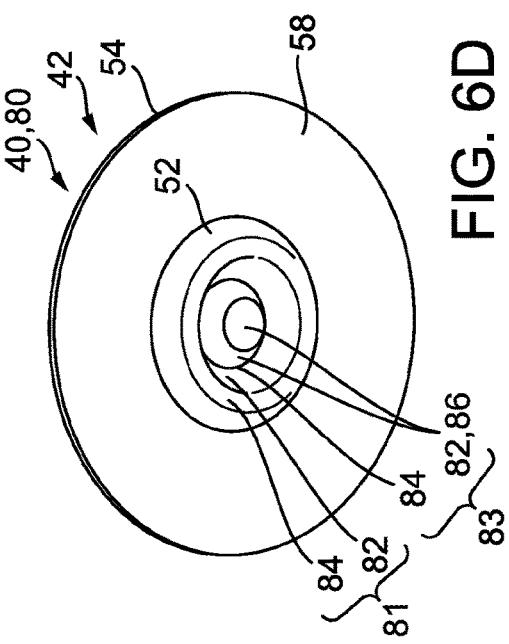
FIG. 6D is a perspective view of the indicator device of FIG. 6A.
Figure 6A:
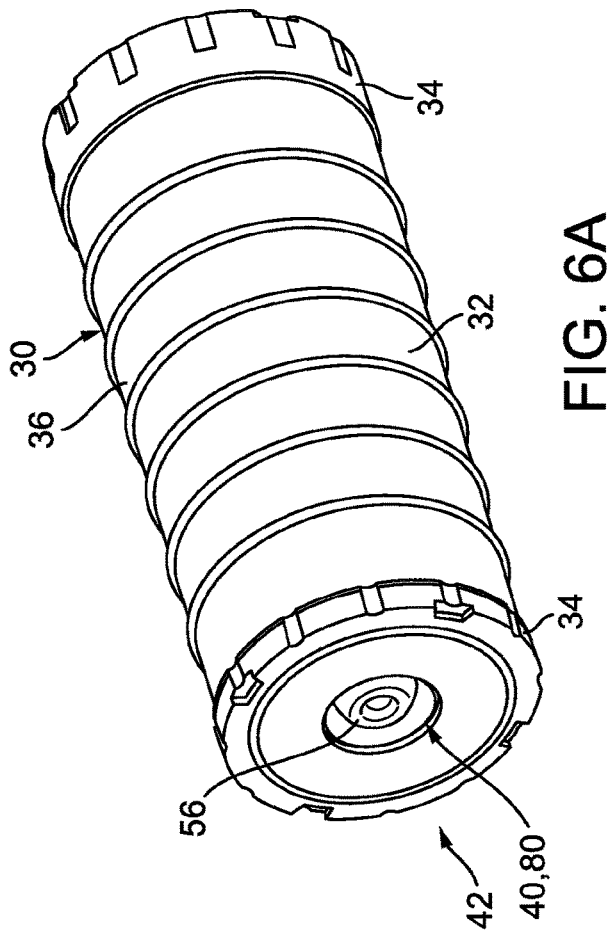
FIG. 6A is a perspective view of a filter element with an indicator device according to still another embodiment in a non-buckled position.
Figure 6B:
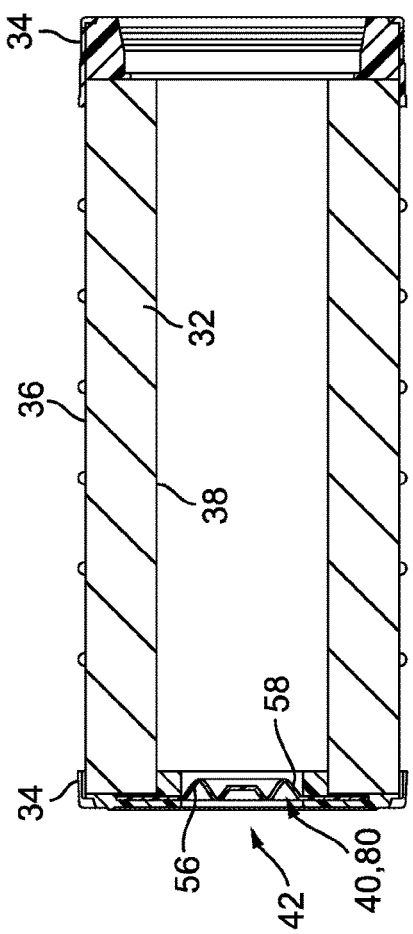
FIG. 6B is a cross-sectional view of the filter element of FIG. 6A.

In particular, the movable portion 52 of the stepped-conical indicator device 80 comprises at least two joints or movable pairs (for example, a first movable pair 81 and a second movable pair 83) that are positioned next to each other, directly or indirectly. Accordingly to one embodiment, the movable portion 52 includes a first movable pair 81 and a second movable pair 83. The first movable pair 81 is positioned radially outward from the second movable pair 83 (and vice versa). The first and second movable pairs 81, 83 are concentric with each other. The second movable pair 83 has a smaller diameter than the first movable pair 81. According to various other embodiments, the movable portion 52 may include additional intermediate movable pairs 85 (as shown in FIG. 19A) positioned radially in between the first and second movable pairs 81, 83, where the first movable pair 81 is the radially outermost movable pair and the second movable pair 83 is the radially innermost movable pair 83. Accordingly, the second movable pair 83 (and every intermediate movable pair 85 there between) can fold into and relative to the first movable pair 81 in the non-buckled position 42, as shown in FIG. 6C. In the non-buckled position 42, the first movable pair 81, the second movable pair 83, and any other movable pairs are pleated (and the respective wall portions, as described further herein, are folded relative to each other). In the buckled position 46, the first movable pair 81, the second movable pair 83, and any other movable pairs are not pleated (and the respective wall portions are not folded relative to each other (but instead may be substantially parallel to and aligned with each other)).

Each of the first movable pair 81, the second movable pair 83, and the third movable pair 85 includes a combination of a radial wall or member portion (referred to herein as a radially inner portion 82) and a radial linkage or hinge portion (referred to herein as a radially outer portion 84) that are positioned directly next to each other. Accordingly, the radially inner portion 82 and the radially outer portion 84 alternate with each other in the radial direction of the indicator device 40. The radially inner portion 82 is positioned radially inward from the radially outer portion 84 (and vice versa). The radially inner portion 82 and the radially outer portions 84 are concentric with each other. The radially inner portion 82 has a smaller diameter than the radially outer portion 84. The radially inner portion 82 of the second movable pair 83 (where the second movable pair 83 is the innermost movable pair) may comprise a base 86 that is positioned in the radially innermost region (i.e., the center) of the indicator device 40. The radially outer portion 84 of the first movable pair 81 is positioned along and movably attached to an inner edge of the attachment portion 54.

Figure 7C:
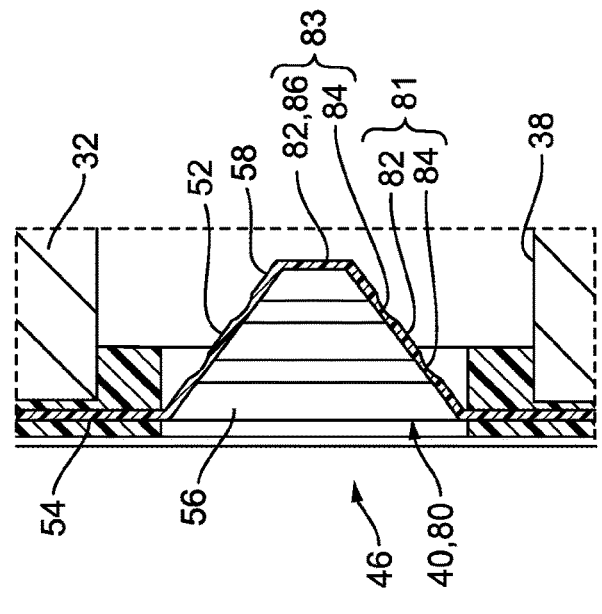
FIG. 7C is a cross-sectional view of a portion of the filter element of FIG. 7A.
Figure 7D:
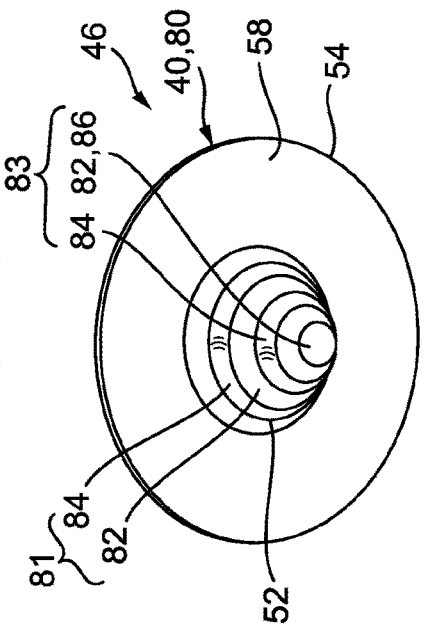
FIG. 7D is a perspective view of the indicator device of FIG. 7A.
Figure 7A:
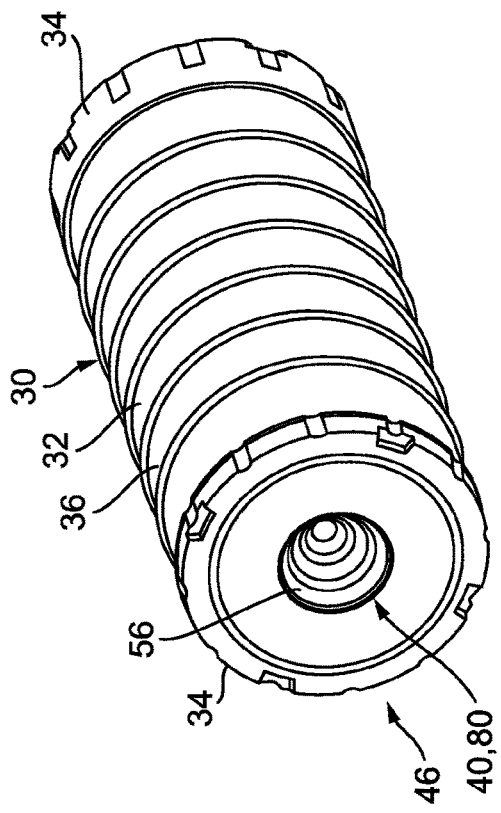
FIG. 7A is a perspective view of the filter element of FIG. 6A in a buckled position.
Figure 7B:
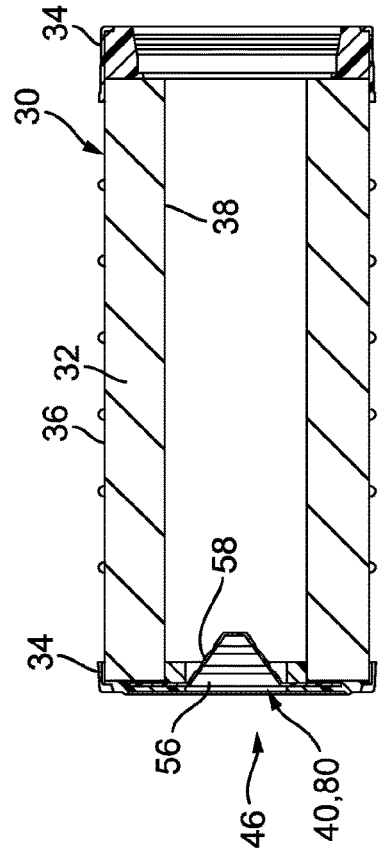
FIG. 7B is a cross-sectional view of the filter element of FIG. 7A.

As shown in FIGS. 6C and 7C, the radially inner portions 82 are sections of the stepped-conical indicator device 80 that are relatively thicker and more rigid than the radially outer portions 84 (which are relatively thinner and more flexible) and may also be longer than the radially outer portions 84, which facilitates the folding and unfolding of the movable portion 52 between the non-buckled position 42 and the buckled position 46. For example, the second movable pair 83 is folded concentrically within the first movable pair 81 in the non-buckled position 42 and extended out of the first movable pair 81 in the buckled position 46. In order to allow the respective radially inner portions 82 to fold along each other concentrically, the radially inner portions 82 (as well as the radially outer portions 84) are approximately circular according to one embodiment.

The radially inner portion 82 of the first movable pair 81 is positioned radially between the radially outer portion 84 of the first movable pair 81 and the radially outer portion 84 of the second movable pair 83. This configuration allows the radially inner portions 82 of each of the respective movable pairs 81, 83 to fold relative to each other in the non-buckled position 42. In the non-buckled position 42, the radially outer portion 84 of the first movable pair 81 creates a corner or living hinge point between the radially inner portion 82 of the first movable pair 81 and the attachment portion 54, and the radially outer portion 84 of the second movable pair 83 (or of an intermediate movable pair 85) creates a corner or living hinge point between two radially inner portions 82 of the first and second movable pairs 81, 83.

In the non-buckled position 42 (as shown in FIGS. 6A-6D), the movable portion 52 of the stepped-conical indicator device 80 is nested or folded into a substantially flat, disc shape with the radially inner portions 82 of each of the respective first and second movable pairs 81, 83 folded relative to each other along the radially outer portions 84 of each of the respective first and second movable pairs 81, 83 into nested cones. Accordingly, in the non-buckled position 42, the radially outer portions 84 (i.e., the hinge portions) are substantially bent in order to fold the radially inner portions 82 (i.e., the wall portions). To move from the non-buckled position 42 to the buckled position 46 as the pressure drop across the filter element 30 increases (as shown in FIGS. 7A-7D), the movable portion 52 is pulled toward the downstream side 38 of the filter element 30, which causes the movable portion 52 to unfold or un-nest by unfolding the first and second movable pairs 81, 83 (and any other movable pairs), thereby creating a full cone shape (with a substantially flat base 86) in which all of the radially inner portions 82 (aside from the base 86 at the most narrow portion) and the radially outer portions 84 are approximately aligned with each other. This allows the base 86 of the movable portion 52 to move and extend toward the downstream side 38 of the filter element 30. Accordingly, in the buckled position 46, the radially outer portions 84 (i.e., the hinge portions) are substantially straight in order to align the radially inner portions 82 (i.e., the wall portions) with each other.

According to one embodiment as shown in FIGS. 19A-19G and FIGS. 20A-20E, the stepped-conical indicator device 80 (in particular the movable portion 52) may be positioned in or movable to and from at least one intermediate position 44 that is between the non-buckled position 42 and the completely buckled position 46. Accordingly, the movable portion 52 of the stepped-conical indicator device 80 comprises at least one intermediate movable pair 85 that is positioned radially between the first movable pair 81 and the second movable pair 83 and comprises an intermediate radially inner portion 82 and an intermediate radially outer portion 84. For example, as shown in FIGS. 19A-19G, the stepped-conical indicator device 80 has two intermediate positions 44 (between the non-buckled position 42 and the buckled position 46) and accordingly comprises six movable pairs (i.e., a first movable pair 81, a second movable pair 83, and four intermediate movable pairs 85, each with a radially inner portion 82 and a radially outer portion 84) that are positioned next each other. Each of the intermediate positions 44 may correspond to different predetermined pressure drops in order to indicate to the user how close the filter element 30 is to needing to be replaced according to the amount of pressure drop. Each of the intermediate positions 44 corresponds to when one of the first movable pair 81 or the second movable pair 83 has been moved (for example, toward the downstream surface 58 of the movable portion 52).

According to one embodiment, the upstream surfaces that are inside each of the folds formed between the radially inner portions 82 of at least the first and second movable pairs 81, 83 may be a different color than the rest of the stepped-conical indicator device 80 in order to clearly indicate to the user once the stepped-conical indicator device 80 has moved into the buckled position 46. In particular, the radially-inward-facing outer surfaces of the radially inner portions 82 (with respect to the non-buckled position 42) may be a different color than the rest of the stepped-conical indicator device 80. These inward-facing outer surfaces are not easily visible while the stepped-conical indicator device 80 is in the non-buckled position 42. However, once the stepped-conical indicator device 80 moves to the buckled position 46, all of the outer surfaces (which may correspond to the upstream surface 56) of the stepped-conical indicator device 80 are exposed. Due to the difference in coloring, the user can clearly see that the stepped-conical indicator device 80 has moved to the buckled position 46.

The stepped-conical indicator device 80 may be constructed out of a variety of different materials, including an elastomer. Furthermore, the stepped-conical indicator device 80 may be a separate part that is overmolded into one of the endcaps 34.

Dome Indicator Device and Cover of the Filter Assembly

Another embodiment of the indicator device 40 is shown in FIGS. 8A-8D, in which the indicator device 40 (that is the dome indicator device 60) is attached to (e.g., integrated or molded into) and closes off a through-hole or aperture of the cover 24 of the filter assembly 20 (rather than into one of the endcap 34 of the filter element 30) as a single-piece. Accordingly, the indicator device 40 and the cover 24 are constructed together as a single-piece and comprise a single unitary component that cannot be separated without destruction.

Figure 8C:
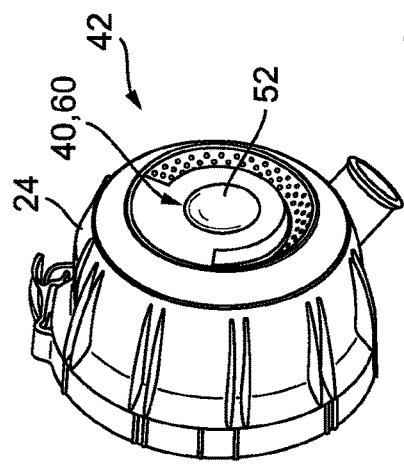
FIG. 8C is a perspective view of a cover of the filter assembly of FIG. 8A.
Figure 8D:
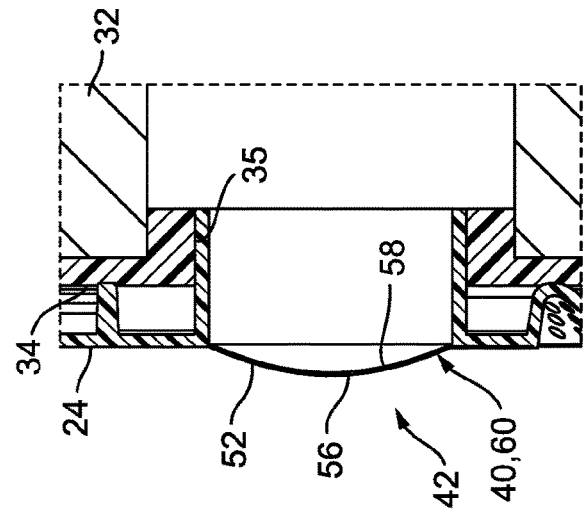
FIG. 8D is a cross-sectional view of a portion of the filter assembly of FIG. 8A.

In order to allow the inner surface of the indicator device 40 (e.g., the downstream surface 58) to be exposed to the air pressure within the inner area of the filter element 30 (e.g., the downstream side 38), the endcap 34 (that is closer or next to the indicator device 40 and the cover 24) comprises or defines a hole 35 (as shown in FIG. 8D) that extends completely through the endcap 34 and allows the inner surface (e.g., the downstream surface 58) of the indicator device 40 to be exposed to the inner air pressure (e.g., downstream air pressure) within the inner area of the filter element 30. The cover 24 and the endcap 34 are radially sealed together (with, for example, a radial seal member) along, for example, the inner surface of the hole 35, which fluidly separates the upstream side 36 and the downstream side 38 of the filter element 30.

According to one embodiment, the filter element 30 may be permanently attached to the cover 24 through embedding or adhering the filter media 32 directly to the cover 24. Accordingly, the filter element 30 and the cover 24 may comprise a single unitary component that cannot be separated without destruction. According to one embodiment, the cover 24 and the endplate 34 may be integrated together into one single element that also may comprise the indicator device 40.

Stepped-Conical Indicator Device and Cover of the Filter Assembly

Another embodiment of the indicator device 40 is shown in FIGS. 9-11B, in which the indicator device 40 (that is the stepped-conical indicator device 80) is a separate component that is subsequently integrated or attached to the cover 24 of the filter assembly 20. According to one embodiment, the indicator device 40 comprises an attachment ring 88 that secures or retains the indicator device 40 to the cover 24. As shown in FIGS. 10B and 11B, the attachment ring 88 extends over the outer surface of the attachment portion 54 of the indicator device 40 and snap fits onto an attachment feature that is molded into the cover 24. According to another embodiment, the stepped-conical indicator device 80 may be a separate part that is overmolded into the cover 24.

Additionally, the endcap 34 of the filter element 30 (that is closest to the stepped-conical indicator device 80)

includes an orifice plate that comprises a substantially flat disc that extends along a plane substantially perpendicular to the direction of movement of the movable portion 52. The disc defines a small, fluidly-restrictive hole, aperture, or orifice 39 (e.g., a pin hole) that extends completely through the endcap 34 and is the only way for fluid to flow through the endcap 34. The orifice 39 is positioned downstream of the filter element 30 and allows the downstream air pressure of the filter element 30 (e.g., the inner air pressure) to reach the downstream surface 58 (e.g., the inner surface) of the indicator device 40, thereby exposing the downstream surface 58 of the indicator device 40 to the downstream pressure. The orifice 39 and its respective disc and orifice plate may include the various features of the orifice 64 and its respective disc and orifice plate 62 (as described further herein) (and vice versa), unless otherwise specified herein.

The cover 24 may be sealed to the outside of this endcap 34 with, for example, a radial seal member, and the indicator device 40 creates an enclosed volume of fluid with the inner area of the filter element 30. This configuration prevents any dirty fluid (e.g., dirty air) from bypassing the filter element 30 and flowing directly to the clean, downstream side 38 of the filter media 32.

Additionally, by having only a small orifice 39 that fluidly connects the downstream surface 58 of the indicator device 40 to the downstream side 38 of the filter element 30, the endplate 34 with the orifice 39 provides additional protection and acts as a safety mechanism in case the indicator device 40 breaks, cracks, fails, or ruptures during use, thereby resulting in a leak between the upstream surface 56 and the downstream surface 58 of the indicator device 40. If the indicator device 40 breaks, the endplate 34 with the orifice 39 only allows a small amount of dirty fluid (e.g., dusty air) to bypass the filter element 30 and flow slowly through the orifice 39 and into the downstream side 38 of the filter element 30 (and eventually to the engine) due to the small size of the orifice 39. Accordingly, the orifice 39 is similar in nature to the orifice 64 and therefore also damps, smooths, or evens out any large transient pressure spikes or pulses or dramatic pressure fluctuations that may result from various transient engine behavior, which prevents the indicator device 40 from preemptively moving into the buckled position 46 due to a brief and temporary spike in pressure drop.

According to one embodiment, the diameter of the orifice 39 is significantly smaller than the disc of its orifice plate and may be approximately 0.2 to 2 mm, preferably approximately 1 mm. With a 1 mm diameter, only approximately 3.8 liters per minute (L/min) can flow through the orifice 39 at terminal restriction if the indicator device 40 breaks, which is very small compared to the full flow volume of the fluid being filtered (which is typically approximately 17,000 to 34,000 L/min).

Filter Media Patch

Another embodiment of the indicator device 40 is shown in FIGS. 12A-12C, in which the filter assembly 20 comprises a small filter media patch 92 positioned on the downstream side of the indicator device 40. The filter media patch 92 may be positioned along an opening extending through the cover 24 or the endcap 34 (that is closer to the indicator device 40 than the other endcap 34) and is positioned between and fluidly separates (except through the filter media patch 92 itself) the downstream surface 58 of the indicator device 40 and the downstream side 38 of the filter media 32. As shown in FIGS. 12B-12C, the filter media patch 92 may be supported by and bonded to ribs 94 that extend through or along the opening in the cover 24 or the endcap 34. The filter media patch 92 closes off and fluidly separates the downstream surface 58 of the indicator device 40 from the downstream side 38 of the filter media 32 such that fluid can only flow through the filter media patch 92 to move between the respective areas along the downstream surface 58 of the indicator device 40 and the downstream side 38 of the filter media 32. The filter media patch 92 may extend along a plane that is substantially perpendicular to the direction of movement of the movable portion 52.

The filter media patch 92 provides additional protection and acts as a safety mechanism in case the indicator device 40 breaks, cracks, fails, or ruptures during use, thereby resulting in a leak between the upstream surface 56 and the downstream surface 58 of the indicator device 40. For example, if the indicator device 40 breaks, any leaking dirty fluid (from the upstream side 36 of the filter element 30, for example) must pass through the filter media patch 92 prior to reaching the downstream side 38 of the filter element 30.

Additionally, the filter media patch 92 is restrictive, which prevents fluid (e.g., air mass) from moving quickly through the filter media patch 92 and only allows a small flow rate of fluid to move through the filter media patch 92. Accordingly, the filter media patch 92 damps, smooths, or evens out any large transient pressure spikes or pulses or dramatic pressure fluctuations that may result from various transient engine behavior, which prevents the indicator device 40 from preemptively moving into the buckled position 46 due to a brief and temporary spike in pressure drop.

Electrical Switch

Figure 13:
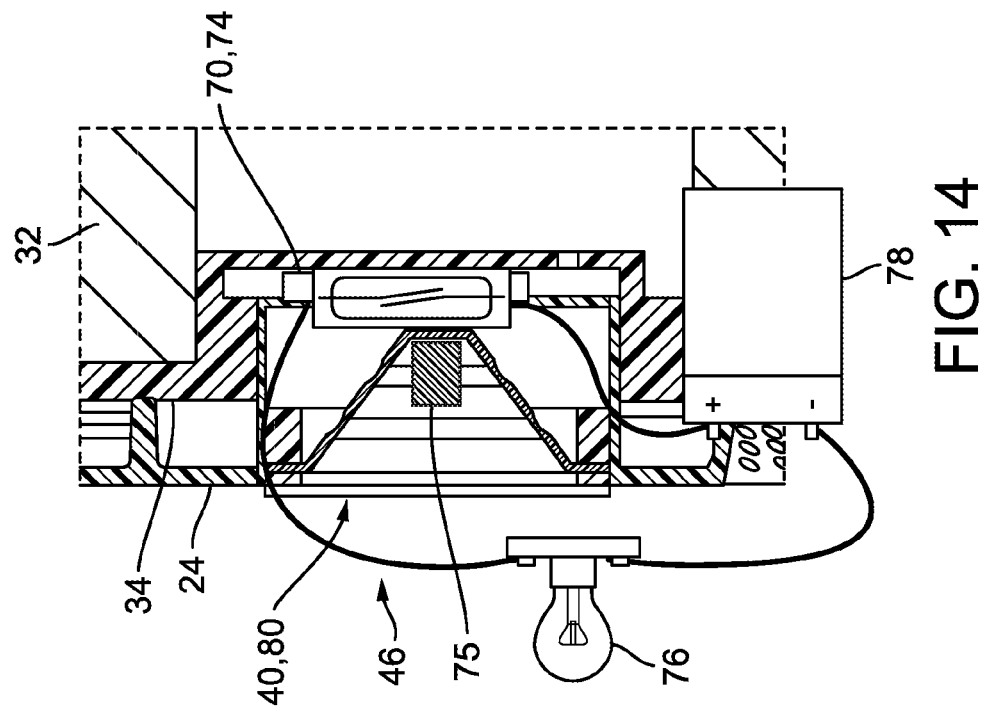
FIG. 13 is a cross-sectional view of a filter assembly according to another embodiment.
Figure 14:
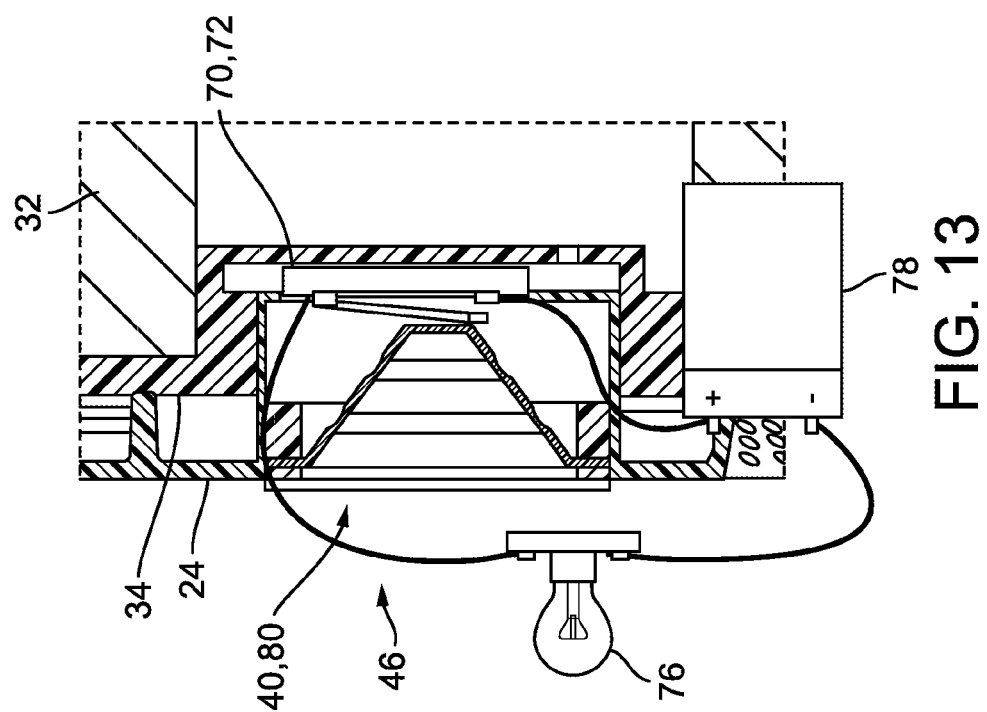
FIG. 14 is a cross-sectional view of a filter assembly according to yet another embodiment.

Another embodiment of the indicator device 40 is shown in FIGS. 13-14, in which the filter assembly 20 further comprises an electrical switch 70 integrated with the indicator device 40 (or with another portion of the filter assembly 20). The electrical switch 70 is activated when the movable portion 52 of the indicator device 40 is in (or moves to) the buckled position 46. When the electrical switch 70 is activated, the electrical switch 70 triggers a separate activatable device 76 (such as an alarm, a visual indicator, or light indicator) in an electrical control unit, which, upon activation, provides an alert the user that the predetermined pressure drop has been met and accordingly that the filter element 30 needs to be replaced. The separate activatable device 76 may be powered with, for example, a battery 78.

According to one embodiment as shown in FIG. 13, the electrical switch 70 is a contact switch 72 that is activated when the indicator device 40 presses, contacts, or pushes on the contact switch 72 after or when moving to the buckled position 46, which completes the circuit between the contact switch 72, the separate activatable device 76, and the battery 78 and activate the separate activatable device 76.

According to another embodiment as shown in FIG. 14, the electrical switch 70 is a reed switch 74 that is activated by a magnet 75 positioned on the indicator device 40 (such as along the base 86). When the magnet 75 is not in close proximity to the reed switch 74, the reed switch 74 is open, and the circuit between the contact switch 72, the separate activatable device 76, and the battery 78 is therefore also open. When the magnet 75 is in close proximity to the reed switch 74, the reed switch 74 closes in order to complete the circuit between the contact switch 72, the separate activatable device 76, and the battery 78 and activate the separate activatable device 76.

However, it is understood that the electrical switch 70 may alternatively be configured to be deactivated when the indicator device 40 moves into the buckled position 46.

Separate Structure

Figure 15B:
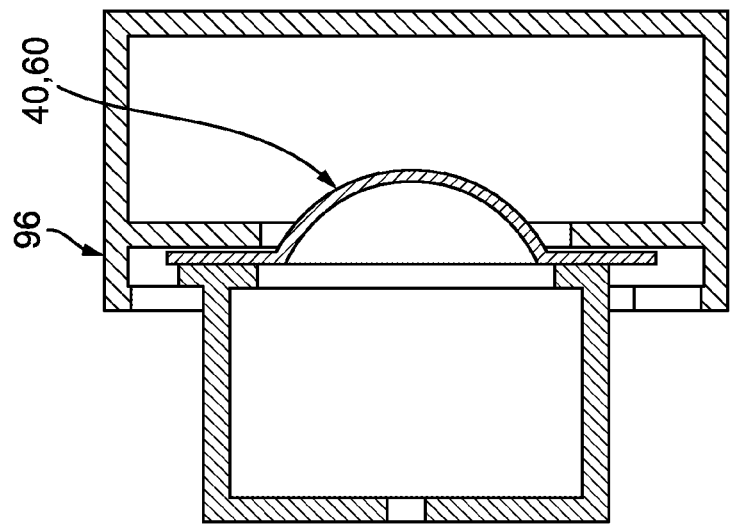
FIG. 15B is a cross-sectional view of the separate structure of FIG. 15A.
Figure 15A:
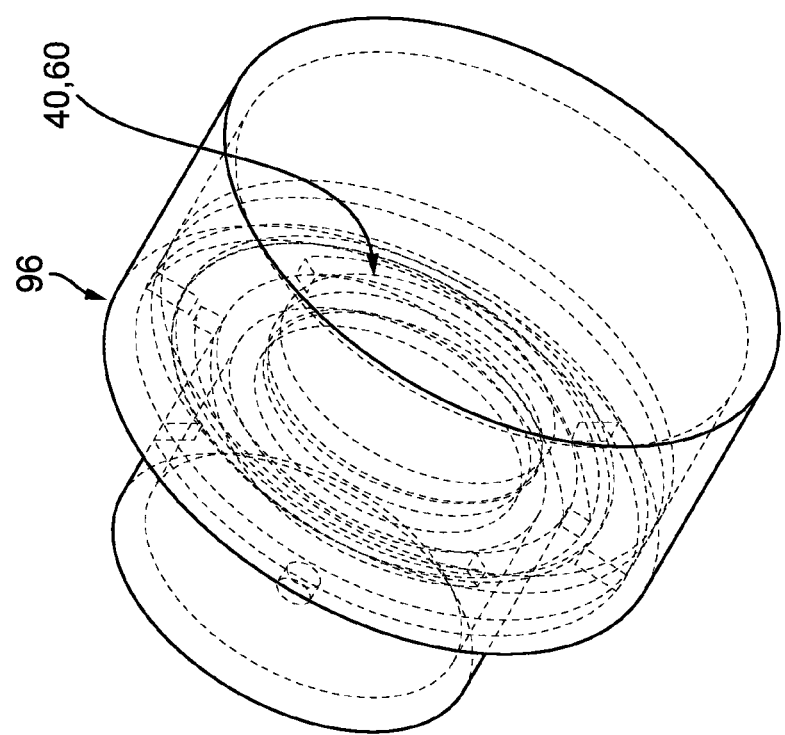
FIG. 15A is a perspective view of a separate structure with an indicator device according to one embodiment.
Figure 20D:
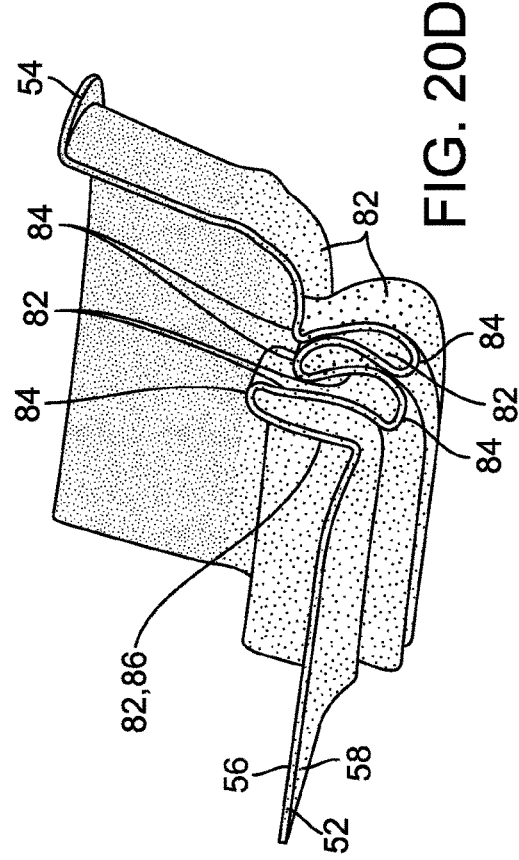
FIGS. 20A-20E are cross-sectional views of a portion of an indicator device according to yet another embodiment in a structural analysis finite element (FEA) model simulation moving from a non-buckled position to an intermediate position.
Figure 20E:
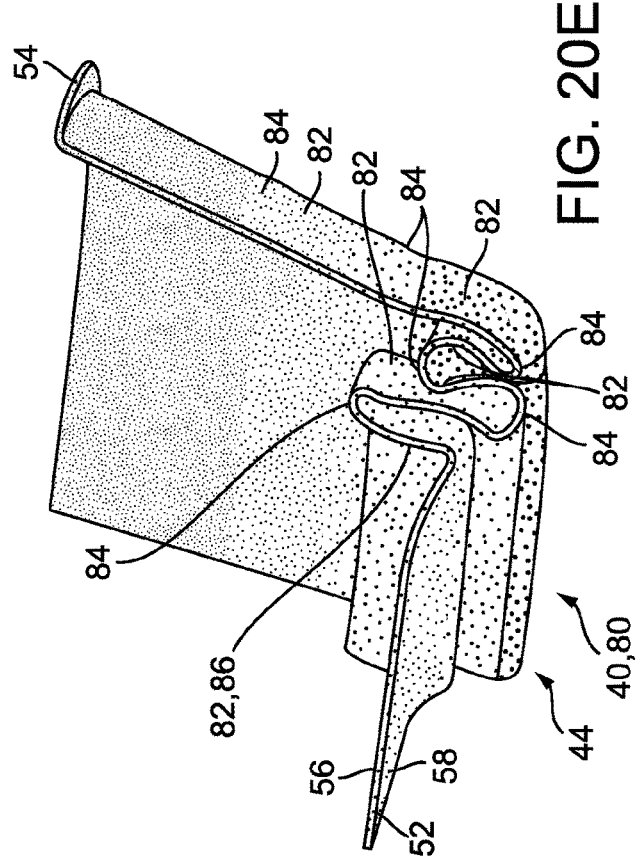
Figure 20A:
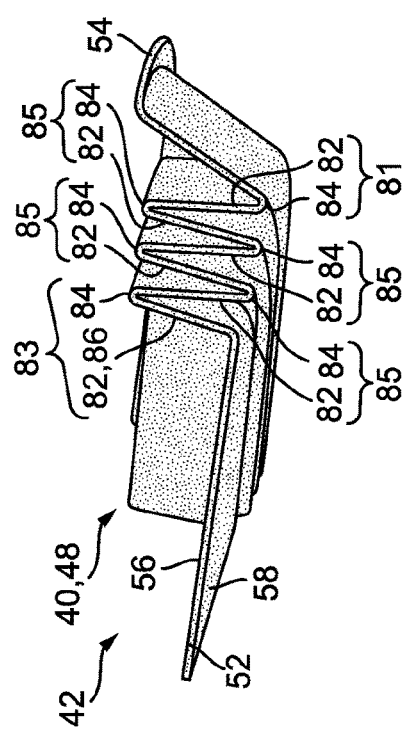
Figure 20B:
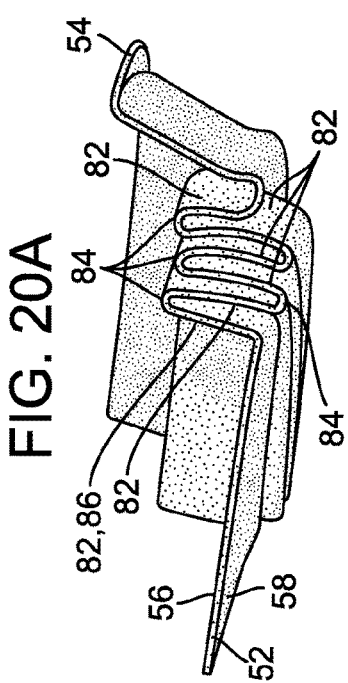
Figure 20C:
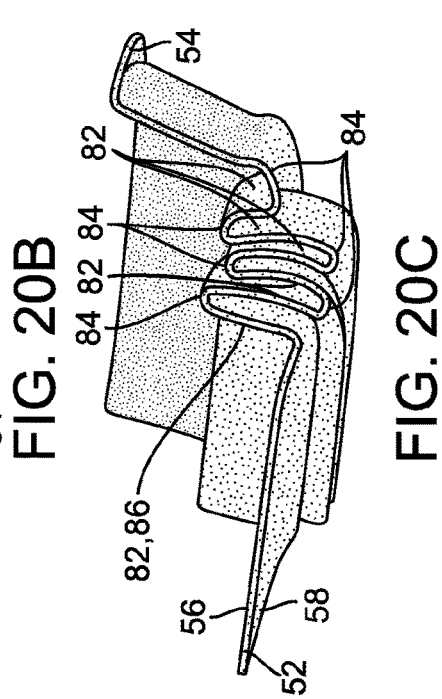

Another embodiment of the indicator device 40 is shown in FIGS. 15A-15B in which an independent indicator device 40 is placed inside of or included within a separate structure 96 (that is separate from and attachable to the rest of the filter assembly 20). The separate structure 96 can be added to a pressure port anywhere downstream of the filter element 30.

Handle

Another embodiment of the indicator device 40 is shown in FIGS. 16A-17C, in which the indicator device 40 comprises an extension or handle 98. The handle 98 may be molded into the rest of the indicator device 40 and extend from or be positioned along the outer surface (e.g., the upstream surface 56) of the movable portion 52 of the indicator device 40. Accordingly, the handle 98 provides an area for a user to grasp the handle 98 in order to easily move the indicator device 40 (in particular the movable portion 52) between the non-buckled position 42 and the buckled position 46 (in particular to pull or return the movable portion 52 of the indicator device 40 from the buckled position 46 back to the non-buckled position 42).

Exemplary Dimensions of an Indicator Device

FIGS. 18A-18D show one configuration of a stepped-conical indicator device 80 with a variety of different potential dimensions. During lab tests, this stepped-conical indicator device 80 buckled and moved into the buckled position 46 under approximately 4 in H$_2$O. This stepped-conical indicator device 80 is constructed out of liquid silicone rubber with a Shore A hardness around approximately 80. The thickness of the stepped-conical indicator device 80 along one of the radially inner portions 82 is approximately 1.8 mm, and the thickness of one of the radially outer portions 84 is approximately 0.5 mm. The inner angle between two adjacent radially inner portions 82 (when in the non-buckled position 42) is approximately 4°. The diameter of an inner pleat (i.e., the outer diameter of the second movable pair 83 when in the non-buckled position 42) is approximately 91 mm. The outer diameter of the movable portion 52 (i.e., at the start of the outermost pleat at the attachment portion 54) is approximately 105 mm. The overall height of the stepped-conical indicator device 80 when in the non-buckled position 42 is approximately 20 mm.

According to one embodiment, the overall thickness of the movable portion 52 may be approximately 0.5 mm or less. Additionally, the outer diameter of the movable portion 52 may be approximately five times larger than the overall height of the indicator device 40 (when in the non-buckled position 42).

The various dimensions of the indicator device 40 may be modified in order to cause the indicator device 40 to buckle at different predetermined pressure drops, according to the desired configuration. For example, by decreasing the diameter of the inner pleat, the indicator device 40 provides less area for the pressure to act on, which thereby increases the amount of pressure drop that the indicator device 40 can withstand before moving from the non-buckled position 42 to the buckled position 46.

Testing

According to one embodiment, a dome indicator device 60 was tested and buckled into the buckled position 46 at approximately 30 in H$_2$O.

FIGS. 20A-20E and FIGS. 21A-21E each show various embodiments of the stepped-conical indicator device 80 moving from the non-buckled position 42 to an intermediate position 44 in a structural analysis finite element (FEA) model.

It is understood that the various features, configurations, and components of the various embodiments disclosed herein can be used in various other embodiments, unless otherwise specified herein. For example, the various features, configurations, and components of and used with the dome indicator device 60 may be used within the stepped-conical indicator device 80, and vice versa.

As utilized herein, the terms "approximately," "substantially," and similar terms are intended to have a broad meaning in harmony with the common and accepted usage by those of ordinary skill in the art to which the subject matter of this disclosure pertains. The term "approximately" as used herein refers to ±5% of the referenced measurement, position, or dimension. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," "attached," and the like as used herein mean the joining of two members directly to one another. Such joining may be stationary (e.g., permanent) or moveable (e.g., removable or releasable).

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A filter element comprising:
a filter media; and
a restriction indicator device comprising an attachment portion and a movable portion, the attachment portion attachable to a portion of the filter element, the movable portion movable relative to the attachment portion between a non-buckled position and a buckled position, the movable portion moving from the non-buckled position to the buckled position once a predetermined pressure drop between an upstream side and a downstream side of the movable portion of the restriction indicator device is met, wherein the movable portion comprises a first movable pair and a second movable pair that each comprise a radially inner portion and a radially outer portion, wherein each radially inner portion is thicker than the corresponding radially outer portion; and wherein each radially inner portion is a wall portion and each radially outer portion is a hinge portion.

2. The filter element of claim 1, wherein the first movable pair and the second movable pair are pleated in the non-buckled position and not pleated in the buckled position.

3. The filter element of claim 1, wherein the second movable pair is folded concentrically within the first movable pair in the non-buckled position and extended out of the first movable pair in the buckled position.

4. The filter element of claim 1, wherein the radially inner portion of the first movable pair is positioned radially between the radially outer portion of the first movable pair and the radially outer portion of the second movable pair.

5. The filter element of claim 1, wherein the radially outer portion of the first movable portion creates a first living hinge point between the radially inner portion of the first movable pair and the attachment portion, wherein the radially outer portion of the second movable pair creates a second living hinge point between the respective radially inner portions of the first movable pair and the second movable pair.

6. The filter element of claim 1, wherein the movable portion comprises at least one intermediate movable pair that is positioned radially between the first movable pair and the second movable pair and comprises an intermediate radially inner portion and an intermediate radially outer portion, wherein the intermediate radially inner portion is thicker than the intermediate radially outer portion, wherein the movable portion is movable to at least one intermediate position between the non-buckled position and the buckled position.

7. The filter element of claim 1, further comprising at least one endplate operatively coupled to the filter media, and wherein the restriction indicator device is attached to and closes off an aperture of the at least one endplate.

8. The filter element of claim 1, further comprising at least one endplate operatively coupled to the filter media, wherein the restriction indicator device is integrated into the at least one endplate.

9. The filter element of claim 1, wherein, when the movable portion is in the buckled position, the movable portion extends further downstream such that the restriction indicator device creates a visual indication that the predetermined pressure drop has been met.

10. The filter element of claim 1, wherein the movable portion extends further upstream in the non-buckled position than in the buckled position.

11. The filter element of claim 1, wherein the restriction indicator device is permanently deformed when the restriction indicator device moves from the non-buckled position to the buckled position such that the restriction indicator device cannot be moved back from the buckled position to the non-buckled position.

12. The filter element of claim 1, wherein the restriction indicator device is temporarily deformed when the restriction indicator device moves from the non-buckled position to the buckled position such that the restriction indicator device can be moved back from the buckled position to the non-buckled position.

13. The filter element of claim 1, wherein the upstream side and the downstream side of the movable portion of the restriction indicator device are fluidly separate from each other except through the filter media.

* * * * *